United States Patent
Tanaka et al.

(10) Patent No.: US 8,525,464 B2
(45) Date of Patent: Sep. 3, 2013

(54) ROTATION DETECTING APPARATUS AND ROTATION DETECTING SYSTEM

(75) Inventors: Ken Tanaka, Nukata-gun (JP); Yasuhiro Fukagawa, Obu (JP); Masaru Touge, Kariya (JP)

(73) Assignees: DENSO CORPORATION, Kariya (JP); Nippon Soken, Inc., Nishio (JP)

( * ) Notice: Subject to any disclaimer, the term of this patent is extended or adjusted under 35 U.S.C. 154(b) by 287 days.

(21) Appl. No.: 12/932,410

(22) Filed: Feb. 24, 2011

(65) Prior Publication Data

US 2011/0262112 A1   Oct. 27, 2011

(30) Foreign Application Priority Data

Feb. 26, 2010   (JP) .................................. 2010-42599

(51) Int. Cl.
*H02P 3/08* (2006.01)
*H02K 11/00* (2006.01)

(52) U.S. Cl.
CPC .................................. *H02K 11/001* (2013.01)
USPC ........... 318/490; 318/811; 318/810; 318/807; 318/767; 318/727

(58) Field of Classification Search
CPC .................................................... H02K 11/001
USPC ................. 318/490, 811, 810, 807, 767, 727
See application file for complete search history.

(56) References Cited

U.S. PATENT DOCUMENTS

| | | | |
|---|---|---|---|
| 5,850,130 A * | 12/1998 | Fujisaki et al. ............ | 318/400.2 |
| 5,869,939 A | 2/1999 | Lander | |
| 5,955,853 A | 9/1999 | Lander | |
| 6,054,791 A | 4/2000 | Lander | |
| 6,150,777 A | 11/2000 | Lander | |
| 7,622,883 B2 * | 11/2009 | Kaizuka et al. ............... | 318/730 |
| 2010/0033064 A1 * | 2/2010 | Tanaka et al. ............... | 310/67 R |

FOREIGN PATENT DOCUMENTS

| JP | 5-52147 | 3/1993 |
|---|---|---|
| JP | H06-339293 | 12/1994 |
| JP | H11-196592 | 7/1999 |
| JP | 2003-111465 | 4/2003 |
| JP | 2010-63347 | 3/2010 |

OTHER PUBLICATIONS

Office Action issued Feb. 26, 2013 in corresponding Japanese Application No. 2011-037229 with English translation.

* cited by examiner

*Primary Examiner* — Bentsu Ro
*Assistant Examiner* — David Luo
(74) *Attorney, Agent, or Firm* — Harness, Dickey & Pierce, PLC

(57) ABSTRACT

A rotation detecting apparatus for detecting a rotational state of a direct-current motor includes a driving device, a control device, an energization detecting device, an alternating-current component detecting device, and a rotational state detecting device. An impedance between brushes of the motor changes periodically in accordance with rotation of the motor. The alternating-current component detecting device detects change of an alternating-current component of electric current that is supplied to the motor based on an electrical quantity. The change of the alternating-current component is caused by change of the impedance caused in accordance with the rotation. The rotational state detecting device detects at least one of a rotation angle, a rotational direction, and a rotational speed of the motor based on a detection result of the alternating-current component detecting device.

6 Claims, 19 Drawing Sheets

FIG. 2A  STATE A (A')
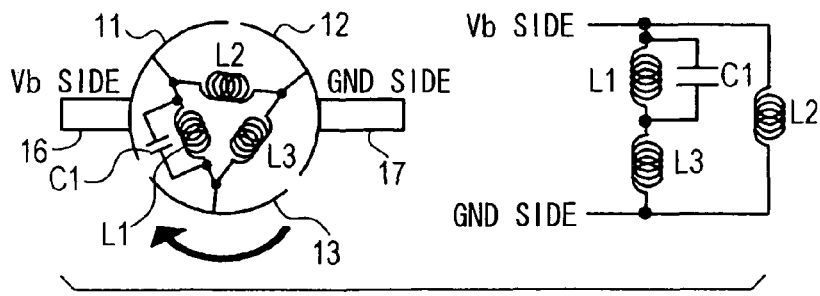
FIG. 2B  STATE B (B')
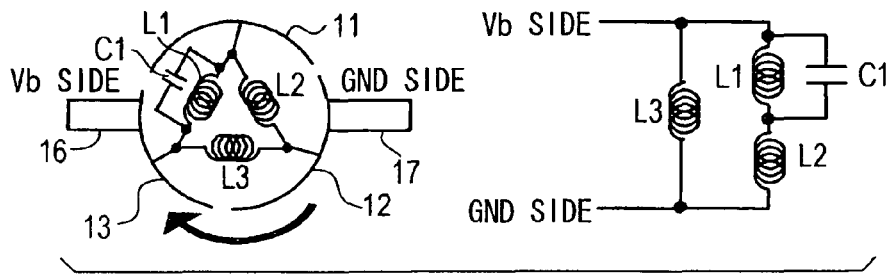
FIG. 2C  STATE C (C')
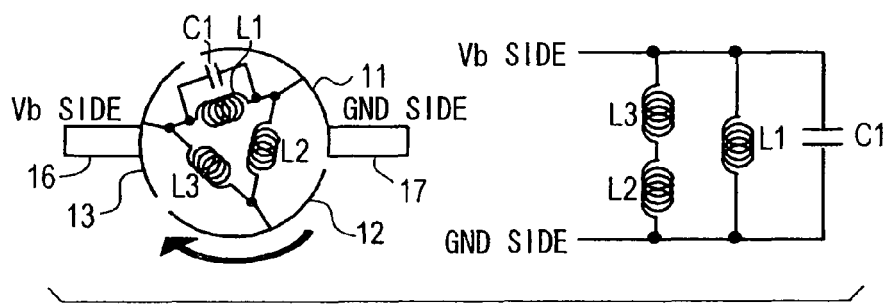
FIG. 2D
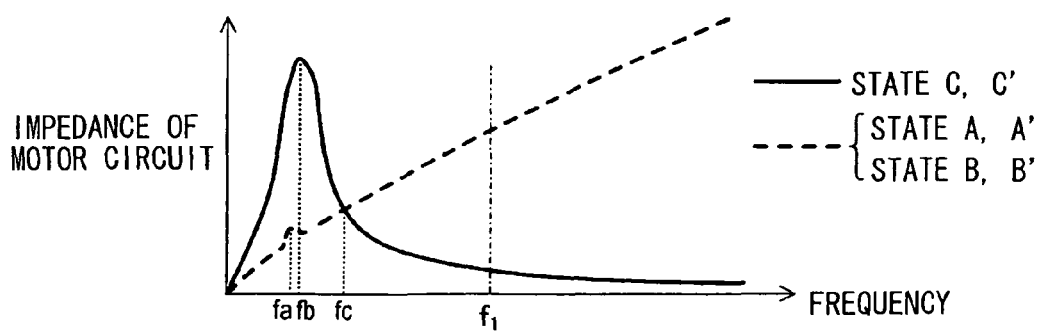

FIG. 8A STATE A (A')
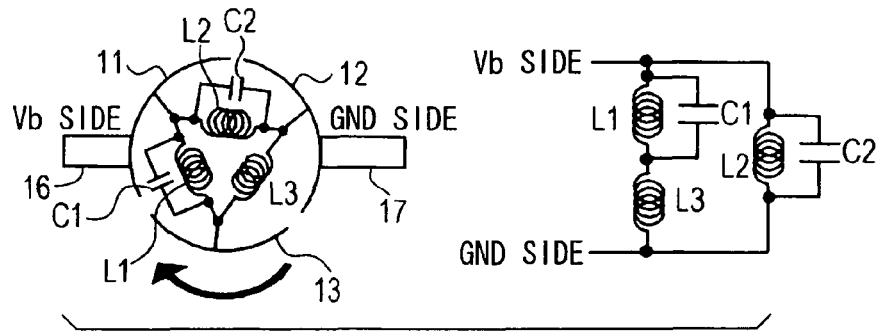
FIG. 8B STATE B (B')
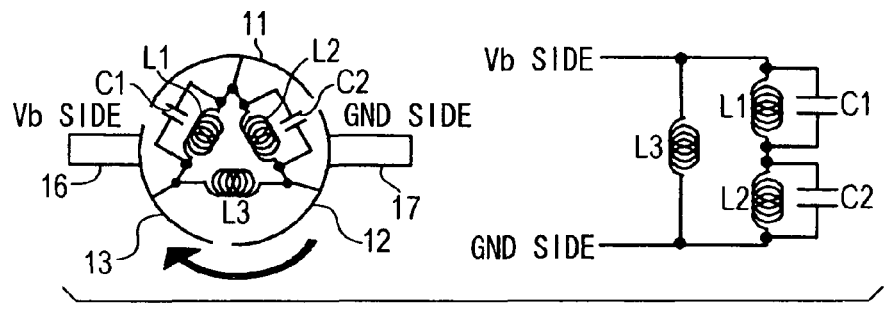
FIG. 8C STATE C (C')
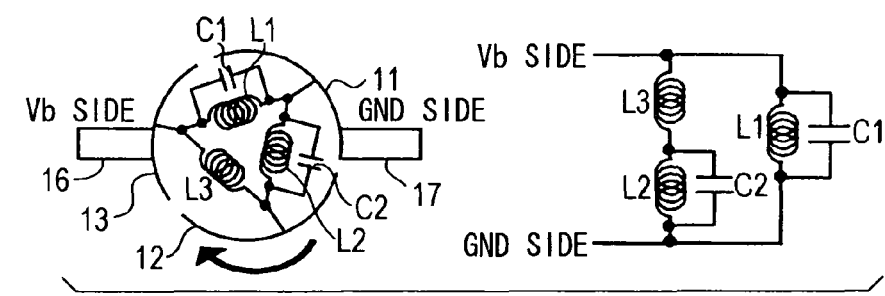
FIG. 8D
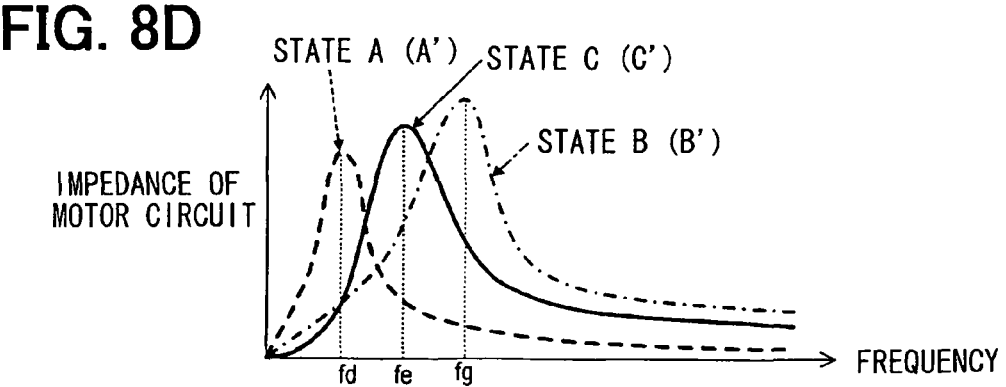

ROTATION DETECTING APPARATUS AND ROTATION DETECTING SYSTEM

CROSS REFERENCE TO RELATED APPLICATION

This application is based on and incorporates herein by reference Japanese Patent Application No. 2010-42599 filed on Feb. 26, 2010.

BACKGROUND OF THE INVENTION

1. Field of the Invention

The present invention relates to a rotation detecting, apparatus that detects a rotational state of a direct-current motor, such as a rotation angle or a rotational direction, and relates to a rotation detecting system having the rotation detecting apparatus.

2. Description of Related Art

A direct-current brush motor (hereinafter referred to as a "direct-current motor") has been conventionally employed in a vehicle. For example, the direct-current motor adjusts opening/closing angles of an air mix damper for adjusting temperature and of a mode damper for switching air outlets of an air conditioner of the vehicle. In the control of the above direct-current motor, a rotational state of the direct-current motor, such as a rotation angle, a rotational direction, a rotational speed, is detected in order to accurately adjust the opening/closing angle of each damper. Then, the above direct-current motor is controlled based on the detected rotational state such that the opening/closing angle of each damper coincides with the desired angle.

A general method for detecting the rotational state of the direct-current motor includes a well-known method, in which a sensor, such as a rotary encoder, a potentiometer, is used, and the rotational state is detected based on the detection signal from the sensor. Thus, the method of detecting the rotational state by using the sensor is employed in the vehicle.

However, in the above method of detecting the rotational state by using the sensor, a sensor-mount space is required for each direct-current motor. Furthermore; additional harnesses for transmitting detection signals of the sensors to another apparatus, such as an on-board ECU, are required in addition to a harness provided to each direct-current motor for supplying direct-current power to the direct-current motor therethrough. As a result, the above requirement increases the weight of the vehicle and increases a cost of manufacture. Thus, sensorless type has been required in order to reduce the numbers of the sensor and the related harnesses.

There have been proposed various sensorless methods for detecting for the rotational state of the direct-current motor without using a large-scale or an extensive sensor, such as the rotary encoder. For example, there is known a method for detecting and counting a surge pulse generated when the connection state between the commutator and the brushes is switched. However, in the above method, the erroneous detection may be more likely to occur when the rotational speed is further reduced because the surge pulse becomes more difficult to detect when the rotational speed is reduced substantially. The above is true because during the operation of the motor under the low speed rotation at the time of starting and stopping the motor, an electromotive force of the motor is reduced, and thereby the surge pulse is reduced accordingly.

Also, in another sensorless method, a resistor is connected between certain two segments among multiple commutator segments of a commutator. In other words, the resistor is connected in parallel to a phase coil that is connected between the certain two segments. A rotation pulse is detected based on an electric current that flows between the two certain segments (see, for example, JP-A-2003-111465).

In the sensorless method described in JP-A-2003-111465, when the direct current is supplied through the brushes to a motor circuit, which, is a circuit of the armature coil having multiple phase coils, the electric current between the brushes periodically changes in accordance with the rotation angle of the motor because the resistor is connected in parallel to one of the phase coils. Because the rotation pulse is detected based on the change of the electric current, it is possible to improve a degree of detection accuracy compared with the detection method merely based on the surge pulse.

However, in the method described in JP-A-2003-111465, the rotation pulse is detected based on the periodical change of the direct current to the motor, which change is caused because the resistor is connected in parallel to the single phase coil. For example, when the direct current changes with other factors other than the connection to the resistor, such as the change of the power source voltage, the rotation pulse may be erroneously detected disadvantageously.

SUMMARY OF THE INVENTION

The present invention is made in view of the above disadvantages. Thus, it is an objective of the present invention to address at least one of the above disadvantages.

To achieve the objective of the present invention, there is provided a rotation detecting apparatus for detecting a rotational state of a direct-current motor that is rotatable by a power supplied from a direct-current power source, the rotation detecting apparatus including a driving device, a control device, an energization detecting device, an alternating-current component detecting device, and a rotational state detecting device. The direct-current motor has at least one pair of brushes, to which a direct-current voltage is applied from the direct-current power source. An impedance between the at least one pair of brushes is changeable periodically in accordance with rotation of the direct-current motor. The driving device is provided in an energization route in a circuit having the direct-current power source and the direct-current motor, wherein the driving device has at least one switching device that is configured to open and close the energization route to control energization therethrough. The control device is configured to turn on and off the least one switching device of the driving device. The energization detecting device detects an electrical quantity of electric current that is supplied to the direct-current motor. The alternating-current component detecting device is configured to detect change of an alternating-current component of the electric current that is supplied to the direct-current motor based on the electrical quantity detected by the energization detecting device, wherein the change of the alternating-current component is caused by change of the impedance caused in accordance with the rotation of the direct-current motor. The rotational state detecting device is configured to detect at least one of a rotation angle, a rotational direction, and a rotational speed of the direct-current motor based on a detection result of the alternating-current component detecting device.

To achieve the objective of the present invention, there is also provided a rotation detecting system that includes a direct-current motor and a rotation detecting apparatus. The direct-current motor rotates when the direct-current motor receives power from a direct-current power source. The rotation detecting apparatus detects a rotational state of the direct-current motor. The direct-current motor has at least one pair of brushes that is applied with direct-current voltage from the direct-current power source, wherein an impedance between the at least one pair of brushes is periodically changeable in accordance with rotation of the direct-current motor. The rotation detecting apparatus includes an energization detecting device, an alternating-current component detecting device, and a rotational state detecting device. The energization detecting device is configured to detect an electrical quantity of electric current supplied to the direct-current motor. The alternating-current component detecting device is configured to detect change of an alternating-current component of the electric current supplied to the direct-current motor based on the electrical quantity detected by the energization detecting device, wherein the change of the alternating-current component is caused by change of the impedance caused in accordance with the rotation of the direct-current motor. The rotational state detecting device is configured to detect at least one of a rotation angle, a rotational direction, and a rotational speed of the direct-current motor based on a detection result of the alternating-current component detecting device.

BRIEF DESCRIPTION OF THE DRAWINGS

The invention, together with additional objectives, features and advantages thereof, will be best understood from the following description, the appended, claims and the accompanying drawings in which:

FIGS. 2A to 2D are explanatory diagrams for explaining three states (or three motor circuits) generated while a motor of the first embodiment rotates 180 degrees;

FIGS. 8A to 8D are explanatory diagrams for explaining three states (three motor circuits) generated while a motor of the second embodiment rotates 180 degrees;

DETAILED DESCRIPTION OF PREFERRED EMBODIMENTS

Embodiments of the present invention will be described below with accompanying drawings.

First Embodiment

Figure 1:
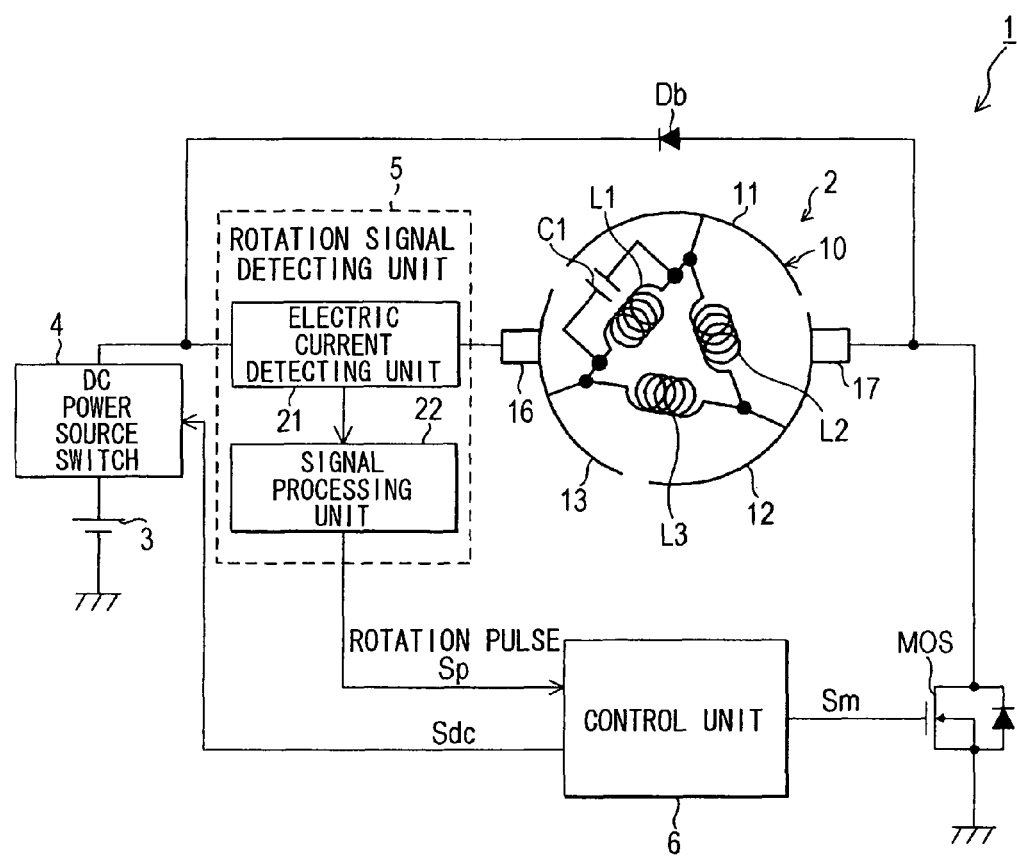
FIG. 1 is a diagram illustrating a schematic configuration of a rotation detecting system according to the first embodiment of the present invention.

FIG. 1 shows a schematic configuration of a rotation detecting system that employs an embodiment of the present invention. As shown in FIG. 1, a rotation detecting system 1 of the present embodiment includes a direct-current motor (hereinafter referred to as merely a "motor") 2, and is configured to detect a rotation angle of the motor 2. The rotation detecting system 1 further includes a direct-current power source 3, a direct-current power source switch 4, a rotation signal detecting unit 5, and a control unit 6. The direct-current power source 3 outputs direct-current voltage for rotating the motor 2 or for generating torque. The direct-current power source switch 4 opens and closes a supply route (energization route) of direct-current electric power from the direct-current power source 3 to the motor 2. In other words, the direct-current power source switch 4 allows and prohibits flow of the direct-current electric power through the supply route from the direct-current power source 3 to the motor 2. The rotation signal detecting unit 5 is provided in the supply route of the direct-current electric power between the direct-current power source switch 4 and the motor 2. Also, the rotation signal detecting unit 5 is configured to generate a signal (rotation pulse Sp) in accordance with the rotation angle of the motor 2, which is generated based on the electric current (motor electric current) that is fed to the motor 2. Then, the rotation signal detecting unit 5 outputs the thus generated rotation pulse Sp. The control unit 6 detects a rotation angle of the motor 2 based on the rotation pulse Sp outputted by the rotation signal detecting unit 5.

The direct-current power source 3 outputs; direct-current voltage of a predetermined voltage value Vb, and applies the direct-current voltage to the motor 2. More specifically, the direct-current voltage is applied to each of brushes 16, 17. The direct-current power source switch 4 is provided between the direct-current power source 3 and the motor 2, and an ON/OFF state of the direct-current power source switch 4 is controlled by a direct-current application control signal Sdc from the control unit 6. When the direct-current power source switch 4 is on, the direct-current voltage of the direct-current power source 3 is applied to the motor 2. When the direct-current power source switch 4 is off, the application of the direct-current voltage of the direct-current power source 3 to the motor 2 is stopped.

Also, an electrical path (or a route) extends from a positive terminal of the direct-current power source 3 to the ground (at aground potential) via the motor 2. A drive switch MOS (corresponding to switching device) is provided in the above route between the ground and a downstream side of the motor 2 or in the route between the ground and the brush 17 of the motor 2 located adjacent the ground. The drive switch MOS is configured to allow and prohibit the electrical conduction of the route. The drive switch MOS is an N-channel MOSFET, and is turned on and off based on the drive signal Sm supplied from the control unit 6. the drive signal Sm from the control unit 6 is a pulse signal corresponding to 0 V (low level) or 5 V (high level), and the drive switch MOS is turned off when the drive signal Sm corresponds to 0 V, and is turned on when the drive signal Sm corresponds to 5 V. Alternatively, the drive switch MOS may be located in the energization route in the circuit upstream of the motor 2. As above, the drive switch MOS is provided in the energization route in a circuit having the motor 2 and the power source 3.

The control unit 6 computes a rotation angle D of the motor 2 and a rotational speed based on a rotation pulse Sp received from the rotation signal detecting unit 5. Then, the control unit 6 controls the direct-current power source switch 4 though the direct-current application control signal Sdc based on the above computation result. Also, the control unit 6 controls the drive switch MOS through the drive signal Sm based on the above computation result. As above, the control unit 6 is capable of controlling the rotation of the motor 2.

The control unit 6 of the present embodiment controls the rotation of the motor 2 under a pulse width modulation (PWM) control during a whole operational period from a start to a stop (described later). For example, during the PWM control, the drive switch MOS is turned on and off based on a predetermined Duty (duty ratio).

More specifically, the drive switch MOS is turned on and off with Duty of 5:5 (referred to as a "steady-state Duty") during the period between the start to a steady rotation, for example. The drive switch MOS is turned on and off with Duty of 1:9 (referred to as a "braking-state Duty") during a braking control for stopping the motor 2 that has been operated under the steady rotation, for example.

Because of the above PWM control, when the proportion of the ON duration within the Duty cycle is increased, torque of the motor 2 is increased accordingly. In contrast, when the proportion of the OFF duration within the Duty cycle is increased, torque of the motor 2 and the rotational speed are decreased accordingly. When the proportion of the OFF duration is increased to obtain the above Duty of 1:9, the motor 2 will be stopped finally although the PWM control includes the ON duration.

Figure 3:
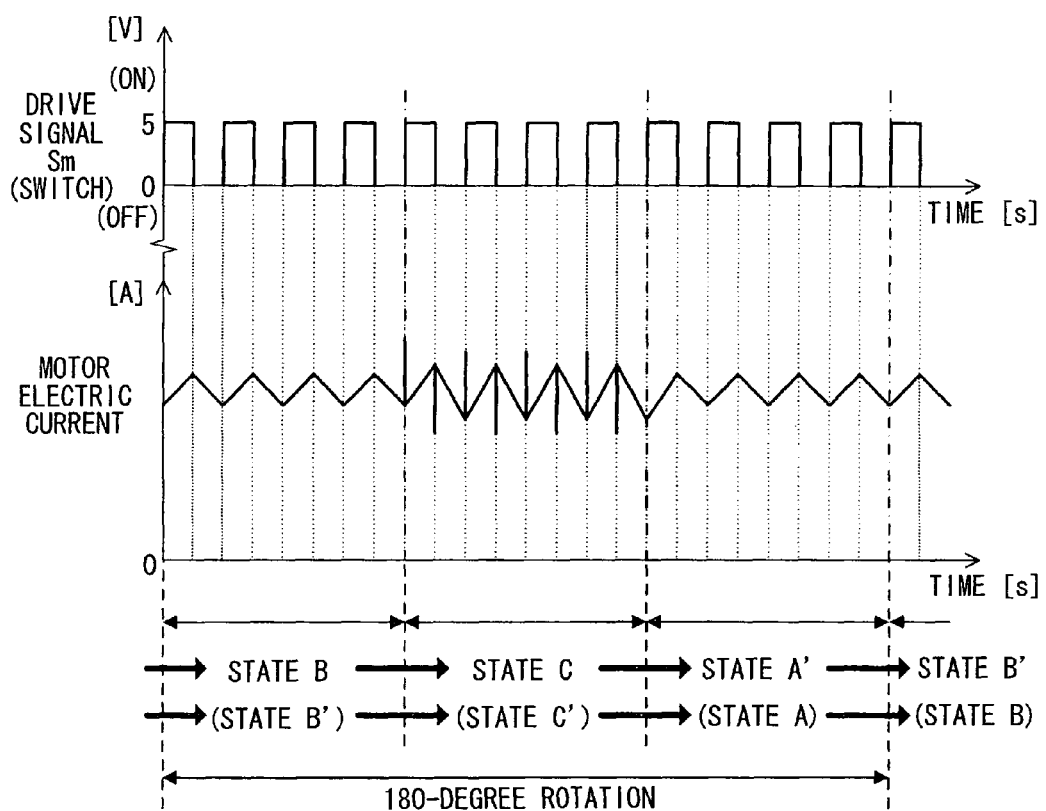
FIG. 3 is a diagram illustrating one example of a motor electric current waveform during rotation of the motor of the first embodiment.

Thus, the electric current fed to the motor 2 during the rotation fluctuates based on the frequency of the PWM control (or PWM frequency Sf), and the electric current has a waveform as shown in FIG. 3. In other words, the electric current fed to the motor 2 during the rotation includes an alternating-current component. It should be noted that FIG. 3 shows one example of the electric current of the motor during the period from the start to the steady rotation, in which period the control unit 6 turns on and off the drive switch MOS with the Duty of 5:5. As is apparent from FIG. 3, when the drive signal Sm becomes 5 V to turn on the drive switch MOS, the motor, electric current is increased. In contrast, when the drive signal Sm becomes 0 V to turn off the drive switch MOS, the motor electric current is decreased. The above change of the motor electric current is repeated with the PWM frequency Sf.

It should be noted that the PWM frequency Sf is designed to be constant in the present embodiment. However, the above is merely one example, and thereby the PWM frequency Sf may be changed accordingly to the operational state as required.

Also, the PWM frequency Sf is set higher than a switching frequency, with which connection state between (a) the brushes' and (b) the commutator segments are switched while the motor 2 rotates at a rated maximum rotational speed. For example, the switching frequency serves as a frequency of the rotation pulse Sp. As described later, in the present embodiment, a rotational state of the motor 2 is detected by using the periodical change in the impedance of the motor 2, which change is caused by the switching of the connection state between (a) the brushes and (b) the commutator segments.

It should be noted that the motor electric current includes a pulse waveform (or a spike waveform) during the period of a state C (C'). The above waveform will be described later.

The motor 2 is a brush three-phase direct-current motor that includes a pair of the brushes 16, 17, an armature coil, and a commutator 10. The brushes 16, 17 are arranged to be opposed to each other. In other words, the brushes 16, 17 are displaced 180 degrees from each other in the rotational direction. The armature coil employs three phase coils L1, L2, L3. The commutator 10 includes three commutator segments 11, 12, 13 that contact the brushes 16, 17. The phase coils L1, L2, L3 of the armature coil are connected to form delta connection.

The first phase coil L1 provides connection between the third commutator segment 13 and the first commutator segment 11. The second phase coil L2 provides connection between the first commutator segment 11 and the second commutator segment 12. The third phase coil L3 provides connection between the second commutator segment 12 and the third commutator segment 13. As above, the commutator 10 and the armature coil having the three phase coils L1, L2, L3 constitute an armature of the motor 2. It should be noted that values of the inductances of the phase coils L1, L2, L3 are equivalent to each other. Also, the phase coils L1, L2, L3 are separately arranged at electrical rotation angles of $2/3\pi$.

Two of the three commutator segments 11, 12, 13 contact the respective brushes 16, 17. The two commutator segments that contact the brushes 16, 17 are switched with rotation of the commutator 10 in accordance with the rotation of the motor 2.

It should be noted that the motor 2 of the present embodiment includes a yoke housing (not shown) and a field. The field is made of a permanent magnet and is provided at a position radially inward of the yoke housing. The armature is provided to be opposed to the field.

Furthermore, in the motor 2 of the present embodiment, a capacitor C1 is provided in parallel to the first phase coil L1.

As is well known, the capacitor C1 serves as a resistor having a substantially high resistance for a direct electric current such that the direct electric current does not substantially flow therethrough. Also, the capacitor C1 has a low impedance characteristic for an alternating electric current, and thereby the alternating electric current more easily flow therethrough when the alternating electric current has a higher frequency. As a result, the existence the path through the capacitor C1 is negligible in the relation between the capacitor C1 and the direct-current power source 3. Thereby, the direct current from the direct-current power source 3 only flows through the phase coils L1, L2, L3.

In contrast, in a comparison case, where a circuit (motor circuit) between the brushes 16, 17 within the motor 2 is considered as an alternating-current circuit, each of the phase coils L1, L2, L3 has high impedance while the capacitor C1 has low impedance. Thus, the difference between the capacitor C1 and the phase coils L1, L2, L3 is relatively large. As a result, for example, when the motor 2 rotates clockwise from a state shown in FIG. 1 (or when the commutator 10 rotates clockwise), and thereby the first commutator segment 11 contacts the brush 17 located on the downstream side (ground-potential side) of the motor 2 in the energization route, a parallel circuit of the first phase coil L1 and the capacitor C1 is formed between the brushes 16, 17. In other words, there is formed an energization route having only the capacitor C1 between the brushes 16, 17, and thereby as a whole motor circuit, there is formed a parallel resonant circuit having the capacitor C1 and a combined inductance of each of the phase coils L1, L2, L3. As a result, in the above state, the impedance between the brushes 16, 17 of the motor circuit has a parallel resonance characteristic, and thereby the impedance becomes lower with the increase of the frequency in a frequency band equal to or greater than the resonance frequency.

In other words, when the motor circuit is considered as a direct-current circuit, the motor circuit is considered to only include the three phase coils L1, L2, L3, and thereby the capacitor C1 will not influence the rotational speed and the torque of the motor 2 that rotates based on the direct current from the direct-current power source 3.

In contrast, when the motor circuit is considered as an alternating-current circuit, the motor circuit formed between the brushes changes with the change of the two commutator segments that contact the brushes 16, 17 in accordance with the rotation angle of the motor 2. As a result, impedance of the motor circuit changes accordingly. Note that, in the present embodiment, because the capacitor C1 is exclusively provided to the first phase coil L1, the impedance changes in two steps during the 180-degree rotation of the motor 2 although the changes in the commutator segments that contact the brushes 16, 17 occurs three times (states A, B, C) during the period.

FIGS. 2A to 2C show a change in the internal connection state of the motor 2 during the 180-degree rotation of the motor 2. In other words, FIGS. 2A to 2C show the change in the motor circuit formed between the brushes 16, 17 during the 180-degree rotation of the motor 2. As shown in FIGS. 2A to 2C, the motor circuit of the motor 2 of the present embodiment changes between three states, such as a state A (FIG. 2A), a state B (FIG. 2B), and a state C (FIG. 2C), during the 180-degree rotation of the motor 2.

In the state A, as shown in FIG. 2A, the first commutator segment 11 contacts the "Vb-side" brush 16 that is located adjacent the positive terminal of the direct-current power source 3. Also, the second commutator segment 12 contacts the "GND-side" brush 17 that is located adjacent the ground at the ground potential. The motor circuit formed between the brushes 16, 17 of the motor 2 in the state A is equivalent to a circuit shown in the right side in FIG. 2A.

In the state A, because the capacitor C1 is connected in series to the third phase coil L3, the energization route that only includes the capacitor C1 is not formed between the brushes 16, 17. As a result, all of the routes from the brush 16 to the brush 17 have any of the phase coils. Thereby, in the state A, the inductance of the phase coils L1, L2, L3 is dominant, and thereby the impedance of the whole motor circuit is relatively high.

In the state B as shown in FIG. 2B, the motor 2 (or the armature) has rotated clockwise about 50 degrees from the state A. Thus, the third commutator segment 13 has been brought into contact with the Vb-side brush 16. The second commutator segment 12 remains in contact with the GND-side brush 17. As above, the commutator segment that contacts the Vb-side brush 16 is switched from the first commutator segment 11 in the state A to the third commutator segment 13 in the state B.

Also in the state B as shown in FIG. 2B, because the capacitor C1 is connected in series to the second phase coil L2, the energization route that only includes the capacitor C1 is not formed between the brushes 16, 17. As a result, all of the routes from the brush 16 to the brush 17 have any of the phase coils. Thereby, in the state B, the impedance in the whole motor circuit is also relatively high. It should be noted that the impedance of the whole circuit in state B is equivalent to the impedance of the whole circuit in the state A as apparent from the equivalent circuits shown in the right sides in FIGS. 2A and 2B.

In the state C as shown in FIG. 2C, the motor 2 has further rotated clockwise about 50 degrees from the state B. The first commutator segment 11 has been brought into contact with the GND-side brush 17. Also, the third commutator segment 13 remains in contact with the Vb-side brush 16. As above, the commutator segment that contacts the GND-side brush 17 is switched from the second commutator segment 12 in the states A, B to the first commutator segment 11 in the state C.

In the state C, (a) the first phase coil L1, (b) the capacitor C1, and (c) a series circuit, which includes the second phase coil L2 and the third phase coil L3, are connected between the brushes 16, 17 in parallel to each other. As a result, the energization route having only the capacitor C1 is formed between the brushes 16, 17. Thereby, the impedance of the motor circuit is relatively low.

In the present embodiment, the parallel resonant circuit as the whole motor circuit is formed, and the impedance has the parallel resonance characteristic. As, a result, the capacitor C1 becomes more dominant, and thereby in an operation with a frequency band higher than the resonance frequency, the impedance becomes lower with the increase of the frequency.

The switch of the commutator segments that contact the brushes 16, 17 (or the switch of the connection state between the commutator segments and the brushes 16, 17) occurs three times during the 180-degree rotation of the motor 2 as above. Thereby, the motor circuit formed between the brushes 16, 17 changes between the three states A, B, C in accordance with the occurrence of the switch of the commutator segments that contact the brushes 16, 17. Note that the impedance in the whole circuit in the state A is equivalent to the impedance in the whole circuit in the state B, and thereby the actual change in the impedance occurs in the two steps during the 180-degree rotation.

It should be noted that in the process of the rotation of the motor 2, there is a switching period, during which a single brush contacts the adjacent two commutator segments. Although the impedance between the brushes changes during the above switching period, the change in the impedance during the switching period is neglected in the present embodiment. The above is true, because the switching period occurs momentarily during one rotation of the motor 2, and thereby the change in the impedance caused by the above momentary switching period is momentary.

When the rotation further proceeds from the state C, the second commutator segment 12 is brought into contact with the Vb-side brush 16. Thus, the commutator segment that contacts the Vb-side brush 16 is switched from the third commutator segment 13 in the state C to the second commutator segment 12. The first commutator segment 11 remains in contact with the GND-side brush 17. The above connection state is equivalent to a state, where the positions of the Vb-side brush 16 and the GND-side brush 17 in the state A are switched from each other, and thereby the impedance in the whole motor circuit in the above state is equivalent to the impedance in the whole motor circuit in the state A. Thus, in the present embodiment, the above state is referred to as a state A'.

When the rotation further proceeds from the state A', the third commutator segment 13 is brought into contact with the GND-side brush 17. In other words, the commutator segment that contacts the GND-side brush 17 is switched from the first commutator segment 11 in the state A' to the third commutator segment 13. The second commutator segment 12 remains in contact with the Vb-side brush 16. The above connection state is equivalent to a state, where the positions of the Vb-side brush 16 and the GND-side brush 17 in the state B are switched from each other, and thereby the impedance of the whole motor circuit in the above sate is equivalent to the impedance of the whole motor circuit in the state B. Thus, the above state is referred to as a state B' in the present embodiment.

When the rotation further proceeds from the state B', the first commutator segment 11 is brought into contact with the Vb-side brush 16. In other words, the commutator segment that contacts the Vb-side brush 16 is switched from the second commutator segment 12 in the state B' to the first commutator segment 11. The third commutator segment 13 remains in contact with the GND-side brush 17. The above connection state is equivalent to a state, where the positions of the Vb-side brush 16 and the GND-side brush 17 in the state C are switched from each other, and thereby the impedance of the whole motor circuit in the above sate is equivalent to the impedance of the whole motor circuit in the state C. Thus, the above state is referred to as a state C' in the present embodiment.

When the rotation further proceeds from the state C', the connection state is switched to the state A. Thus, subsequently, the connection state changes with the rotation in the order of the state B→the state C→the state A'→the state B'→the state C'→the state A→ . . . .

In other words, the motor circuit of the motor 2 changes between the six states A, B, C, A', B', and C' in accordance with the rotation angle during the one rotation. More specifically, the connection state changes every 60-degree rotation. In the above six states, the impedance in each of the states A, B, A', and B' is equivalent to each other and indicates high impedance. Also, the impedance in each of the states C, C' is equivalent to each other, and indicates a value lower than the impedance in the state A.

FIG. 2D shows a frequency characteristic of the impedance of the motor circuit in each state. As above, the impedances of the motor circuit under the states A, B, A', B' are equivalent, to each other. In the case of the states A, B, A', B', the influence caused by the capacitor C1 is negligible, and the impedance increases with the increase of the frequency as a whole, although there is a peak value (small resonance point) generated at the frequency fa.

In contrast, in the case of the states C, C', resonance between each of the phase coils L1, L2, L3 and the capacitor C1 widely changes the impedance characteristic, and the impedance decreases from a maximum value at a resonance frequency fb with the increase of the frequency as shown in FIG. 2D. As a result, the impedance in the states A, B, A', B' is different from the impedance in the states C, C' except the impedance at the frequency fc, at which the impedance curves cross with each other. Specifically, in the frequency band equal to or greater than the frequency fc, the difference in the impedance becomes larger.

Also, the change in the impedance of the above motor circuit is directly reflected to the change in the alternating-current component contained in the motor electric current that is fed to (or flows through) the motor 2.

More specifically, as shown in FIG. 3, in the states A, B, A', B', there is not formed the route, which has only the capacitor C1, between the brushes 16, 17, and thereby the impedance of the motor circuit is relatively large. As a result, the electric current fluctuates with a relatively small amplitude in accordance with the on/off state of the drive switch MOS.

In contrast, in the states C, C', there is formed the route, which has only the capacitor C1, between the brushes 16, 17. As a result, when the drive switch MOS is turned on during a period of the state C, C' (corresponding to capacitance element connection period), inrush current (pulse electric current) to the capacitor C1 is generated at the moment of the turn-on. The inrush current serves as a charge electric current for charging the capacitor C1. After the capacitor C1 has been instantly charged by the inrush current, the motor electric current keeps increasing by a rate accordingly to the combined inductance value of the motor circuit until the drive switch MOS is turned off.

When the drive switch MOS is turned off, electric charge of the capacitor C1 is discharged at the moment of the turn-off, and the discharge causes the flow of the pulse electric current (discharge electric current). After the electric charge of the capacitor C1 has been momentarily discharged through the discharge electric current, the motor electric current decreases at the rate accordingly to the combined inductance value of the motor circuit until the drive switch MOS is turned on.

When the rotation is under the states C, C', the electric current fluctuates based on the PWM frequency similarly to the case of the states A, B, A', B'. In addition to the above fluctuation; at the states C, C', the pulse electric current is generated at the timing of turning on and off the drive switch MOS by the charge and discharge of the capacitor C1, which is connected between the brushes 16, 17.

Thus, in the present embodiment, the rotation signal detecting unit 5 generates a rotation pulse Sp based on the above change of the motor electric current caused by impedance change of the motor circuit due to the rotation of the motor 2. In the present embodiment, more specifically, the rotation signal detecting unit 5 generates the rotation pulse Sp based on the existence of the pulse electric current. Then, the control unit 6 detects the rotation angle of the motor 2 based on the rotation pulse Sp.

Change of the energization electric current of the direct-current motor (or the change of the alternating-current component) caused by the PWM control is various depending on how the impedance between the brushes of the direct-current motor changes in accordance with the rotation, and depending on how the circuit configuration causes the change of the impedance. As a result, the amplitude of the change of the alternating-current component depends on the amplitude of the impedance change and depends on the circuit configuration.

The good detection of the rotational state is achievable with the larger change of the alternating-current component caused by the rotation. Thus, in consideration of the above, the direct-current motor may be configured such that there is a capacitance element connection period in one rotation of the direct-current motor, for example. In the above configuration, the charge electric current and the discharge electric current are generated momentarily and sharply during the capacitance element connection period, and the values of the electric currents are relatively large. More specifically, in the capacitance element connection period, the drive circuit of the motor forms a certain state, where a capacitance element having a predetermined capacitance value is equivalently formed between the pair of the brushes. When the direct-current motor is configured as above, the charge electric current flows through the capacitance element at timing of opening the energization route from the direct-current power source to the direct-current motor in the PWM control during the capacitance element connection period in the one rotation of the direct-current motor. Also, in the PWM control, the discharge electric current, which discharged from the capacitance element, flows at the timing of closing the energization route during the capacitance element connection period.

Thus, the direct-current motor is configured as above such that the capacitance element connection period is generated. For example, at least one of the charge electric current and the discharge electric current correspond to the alternating-current component. Thus, a signal processing unit 22 described below (corresponding to an alternating-current component detecting device) is configured to detect the change of the alternating-current component based on the as at least one of the charge electric current and the discharge electric current.

As above, it is possible to detect the rotational state based on the charge electric current and the discharge electric current during the capacitance element connection period. As a result, it is possible to more reliably detect the rotational state.

Figure 4:
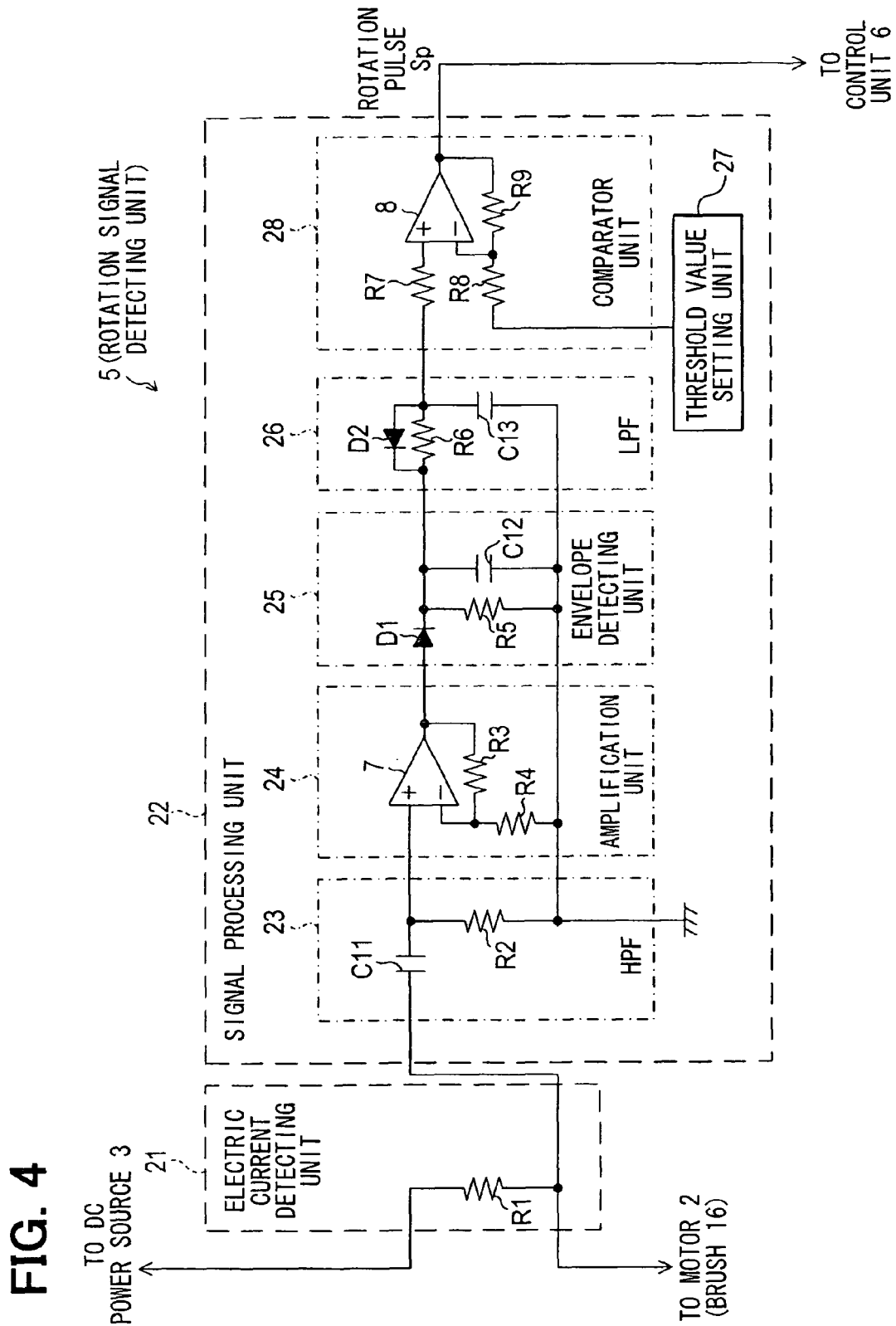
FIG. 4 is a circuit diagram illustrating a configuration of a rotation signal detecting unit of the first embodiment.

FIG. 4 shows a specific configuration of the rotation signal detecting unit 5. The rotation signal detecting unit 5 includes an electric current detecting unit 21 and the signal processing unit 22. The electric current detecting unit 21 detects the electric current fed to the motor 2 or the voltage (potential) relative to the ground. The signal processing unit 22 executes various signal processing based on the motor electric current or the voltage detected by the electric current detecting unit 21 to generate the rotation pulse Sp.

The electric current detecting unit 21 includes an electric current detecting resistor R1 located in the energization route, through which the motor electric current flows. The voltage across the electric current detecting resistor R1 is retrieved by the signal processing unit 22 as a detection signal in accordance with the motor electric current. Alternatively, the voltage (potential) at a point between the resistor R1 and the motor 2 relative to the ground is retrieved by the signal processing unit 22 as the detection signal in accordance with the voltage. The detection signal corresponds to an electrical quantity.

The signal processing unit 22 includes a high-pass filter (HPF) 23, an amplification unit 24, an envelope detecting unit 25, a low-pass filter (LPF) 26, a threshold value setting unit 27, and a comparator unit 28.

The HPF 23 is a known high frequency pass filter circuit having the capacitor C11 and a resistor R2. When the detection signal by the electric current detecting resistor R1 is fed to the signal processing unit 22, the HPF 23 of the signal processing unit 22 cuts the component of the detection signal within the frequency band lower than a predetermined cut-off frequency. As a result, the detection signal with a frequency band equal to or greater than the cut-off frequency passes through the HPF 23.

The cut-off frequency is set to a frequency f1 that is greater than the frequency fc shown in FIG. 2D. The signal having the frequency equal to or greater than the frequency f1 is capable of passing through the HPF 23.

The signal capable of passing through the HPF 23 includes the frequency component of the pulse electric current generated at the moment of the turning on and off of the drive switch MOS at the states C, C'. The pulse electric current includes a basic wave frequency and a harmonic wave having a frequency that is n times of the frequency of the basic wave frequency. For example, the basic wave frequency has a predetermined frequency that is higher than the cut-off frequency f1. The harmonic wave has a frequency fn that is n times of the predetermined frequency of the basic wave frequency. The above n is a natural number equal to or greater than 2. In the present embodiment, all of the frequency components of the pulse electric current passes through the HPF 23, and is fed to the subsequent amplification unit 24.

The amplification unit 24 includes an operational amplifier 7, a resistor R3, and a resistor R4. The resistor R3 is provided between an output terminal and an inverted input terminal of the operational amplifier 7. The resistor R4 is provided between the inverted input terminal of the operational amplifier 7 and the ground. The signal (detection signal from the HPF 23) fed to a non-inverted input terminal of the operational amplifier 7 is, amplified by a predetermined amplification factor.

The envelope detecting unit 25 obtains an envelope of the detection signal amplified by the amplification unit 24. The envelope detecting unit 25 includes a rectifier diode D1, a resistor R5, and a capacitor C12. The resistor R5 has one end connected with a cathode of the diode D1 and has the other end connected with the ground. The capacitor C12 has one end connected with the cathode of the diode D1- and has the other end connected with the ground. The detection signal from the amplification unit 24 is fed to an anode of the diode D1.

The envelope detecting unit 25 obtains the envelope of the detection signal fed from the amplification unit 24, and generates a constant signal (referred to as a "envelope signal") in accordance with the amplitude of the detection signal.

Then, the LPF 26 cuts off the high frequency component of the generated envelope signal, and the cut-off envelope signal is fed to the comparator unit 28. The LPF 26 has a known configuration having a resistor R6 and a capacitor C13. It should be noted that the LPF 26 has a diode D2 provided in parallel to the resistor R6. A flow direction in the diode D2 is opposite from the direction, in which the envelope signal is fed to the LPF 26 as shown in FIG. 4.

The comparator unit 28 includes a comparator 8, a resistor R9, a resistor R7, and a resistor R8. The resistor R9 is provided between an output terminal and an inverted input terminal of the comparator 8. The resistor R7 has one end connected with a non-inverted input terminal of the comparator 8 and has the other end connected with the LPF 26. The resistor R8 has one end connected with the inverted input terminal of the comparator 8 and has the other end connected with the threshold value setting unit 27.

The envelope signal outputted from the envelope detecting unit 25 is fed to the comparator unit 28 via the LPF 26. Then, in the comparator unit 28, the envelope signal is fed to the non-inverted input terminal of the comparator 8 via the resistor R7. Also, a threshold value is fed to the inverted input terminal of the comparator 8 via the resistor R8 from the threshold value setting unit 27. Then, the comparator 8 compares the envelope signal with the threshold value, and outputs the comparison result.

The threshold value setting unit 27 sets a threshold value to be inputted to the comparator unit 28. In the present embodiment, the threshold value is set to a predetermined value greater than the envelope signal during the period of the states A, B, A', B' that has the greater impedance. Also, the predetermined value of the threshold value is set smaller than the envelope signal during the period of the states C, C', which has the smaller impedance, and in which the pulse electric current is generated at the timing of turning on and off the drive switch MOS.

As a result, because the envelope signal inputted to the comparator unit 28 from the envelope detecting unit 25 during the period of the states A, B, A', B' is 0 V that is smaller than the threshold value given from the threshold value setting unit 27, the comparator 8 outputs the signal, of the low level. In contrast, because the envelope signal inputted to the comparator unit 28 from the envelope detecting unit 25 during the period of the states C, C' is greater than the threshold value, the comparator 8 outputs the signal of the high level.

The signal of the low level and the high level outputted from the comparator 8 serves as the rotation pulse Sp in accordance with the rotation angle of the motor 2. Thus, the rotation pulse Sp is outputted to the control unit 6.

As above, the signal processing unit 22 executes the various signal processing to the motor electric current (detection signal) detected by the electric current detecting resistor R1 to generate the rotation pulse Sp. As a result, it is possible to generate the accurate rotation pulse Sp that is free of the disturbance and has reduced noise.

The control unit 6 detects the rotation angle and the rotational speed of the motor 2 based on the rotation pulse Sp received from the signal processing unit 22 through a method of, for example, detecting and computing the leading edge of the rotation pulse Sp.

Next, one example of a motor electric current waveform during a period from the start of the motor 2 (start of rotation) to the stop of the motor 2 will be described with reference to FIG. 5. Also, the generation of the rotation pulse Sp by the signal processing unit 22 based on the motor electric current will be generally described with reference to FIG. 5.

Figure 5:
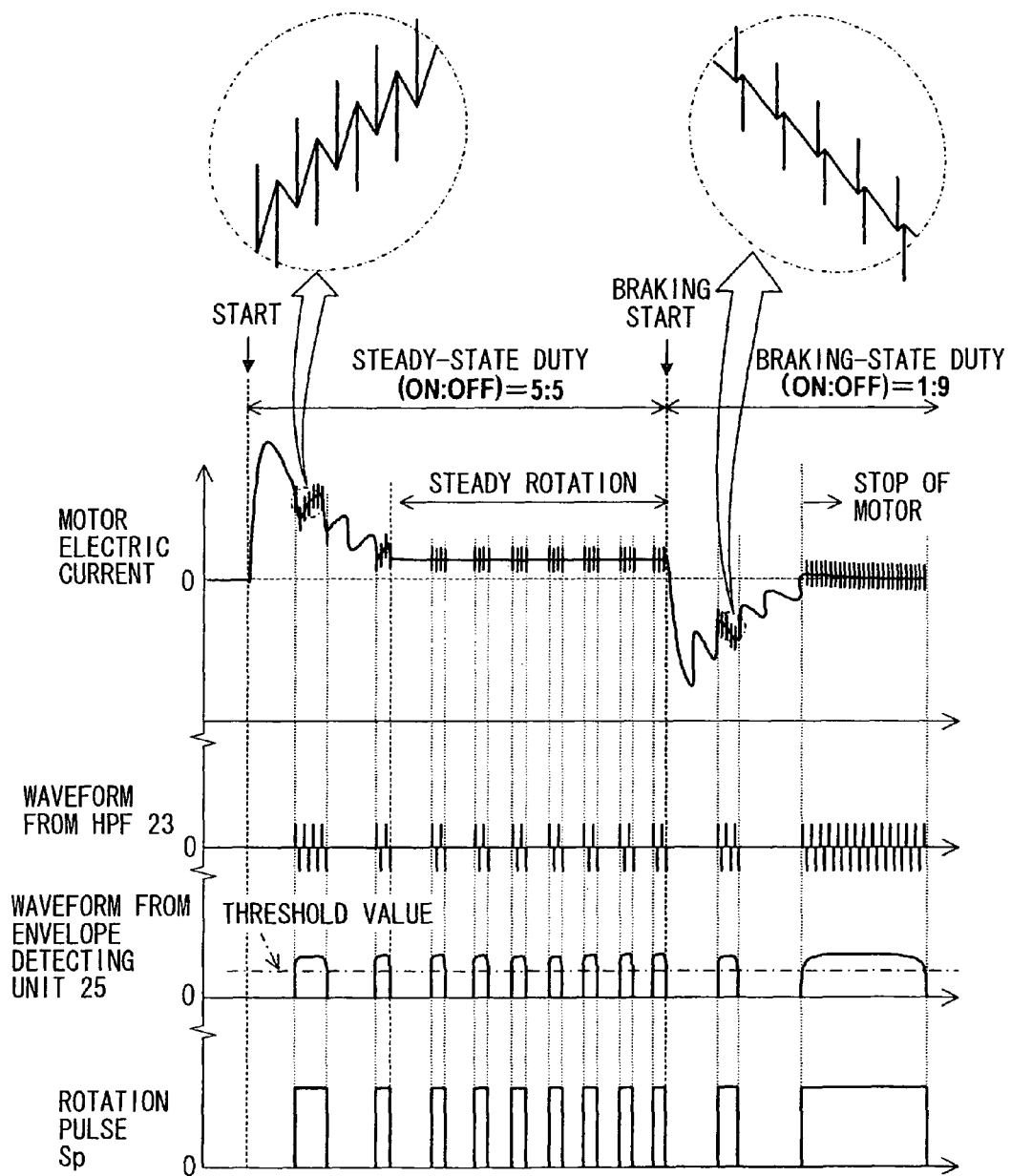
FIG. 5 is an explanatory diagram for explaining a signal processing unit of the first embodiment.

As shown in FIG. 5, after the start, the electric current sharply rises temporarily and then converges to a certain electric current value in an initial stage before the operation becomes a steady rotational state. When the operation has become the steady rotational state, the average of the electric current value becomes a constant. Because the steady-state Duty is 5:5 during the period from the start to the steady rotation state, the duration of ON state and the duration of the OFF state of the drive switch MOS are equivalent to each other. The pulse electric current is generated at the time of turning on and off during the period of the states C, C'.

When the braking control is started, the drive switch MOS is controlled with the braking-state Duty in the present embodiment as described above. More specifically, because the braking-state Duty is 1:9, the duration of the ON state of the drive switch MOS is substantially shorter than the duration of the OFF state of the drive switch MOS. thus, at the start of the braking control, a counter-electromotive force of the motor 2 widely changes and temporarily causes the motor electric current to flow in a direction opposite from the direction of the steady rotation. Then, the motor electric current gradually goes back to 0, and then converges to the average electric current in accordance with the braking-state Duty of the ratio 1:9 to end the rotation of the motor 2. During the above period from the start of the braking control to the stop, the pulse electric current is generated at the timing of turning on and off of the drive switch MOS during the period of the states C, C' similarly to the steady rotation state.

As a result, during the full period from the start to the stop, the HPF 23 basically outputs nothing during the states A, B, A', B', but outputs the frequency component of the pulse electric current during the states C, C'. The envelope detecting unit 25 obtains the envelope signal based on the detection signal that corresponds to the pulse electric current. After the LPF 26, the comparator unit 28 compares the envelope signal with the threshold value set by the threshold value setting unit 27. Then, the rotation pulse Sp is generated during the period, in which the envelope signal is greater than the threshold value.

It should be noted that the motor electric current waveform shown in FIG. 5 illustrates only the pulse electric current during the period of the states C, C' among alternating-current components of the motor electric current. Thus, the waveform other than the pulse electric current is omitted in the drawing. In other words, the waveform of the fluctuation (see FIG. 3) caused by the PWM frequency Sf over the full period is not illustrated in FIG. 5. The above is also true for FIG. 13.

In the present embodiment, the supply of the direct-current electric power from the direct-current power source 3 is not completely stopped during the period from the start to the steady rotation state and also during the period of the braking control state. However, the PWM control with the predetermined Duty is executed to supply electric current to the motor 2. The PWM control is executed with Duty (or the braking-state Duty) for stopping the motor 2 during the period of the braking control state, and the PWM control is continued until the rotation of the motor 2 is stopped. As a result, it is possible to reliably detect the rotation angle of the motor 2 regardless of the rotational speed. The PWM control may be continued with a Duty, which will not rotate the motor 2, even after the completion of the stop.

It should be noted that the rotation detecting system 1 of the present embodiment is configured to detect the rotation angle of the motor 2 based on the rotation pulse Sp. However, the rotation detecting system 1 may be alternatively configured to detect the rotational speed of the motor 2 based on the intervals of the rotation pulse Sp (for example, the intervals of the leading edges).

Figure 6:
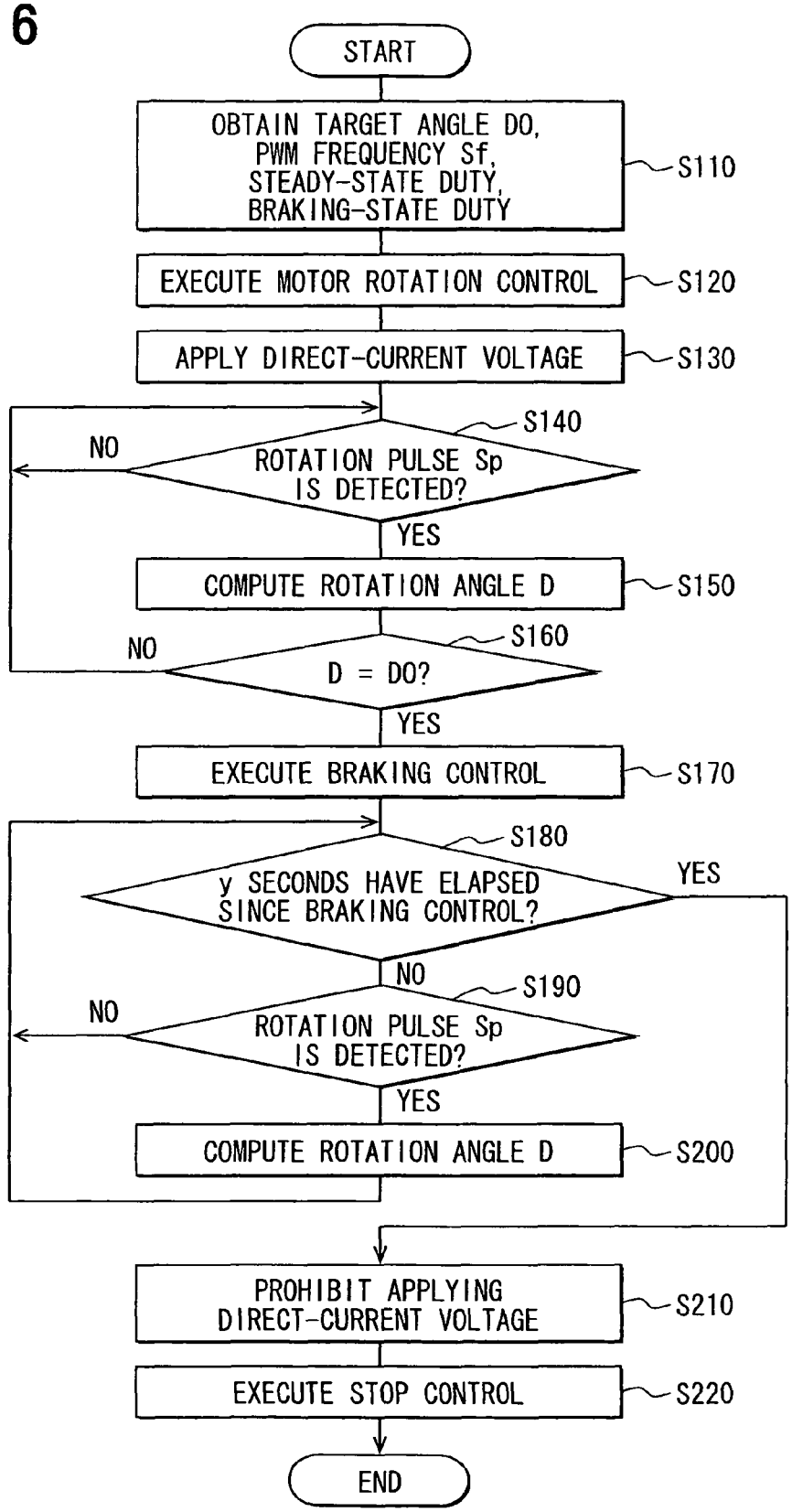
FIG. 6 is a flow chart illustrating a motor drive control process of the first embodiment.

Next, a motor drive control process executed by the control unit 6 for a rotation control of the motor 2 and a computation of the rotation angle D will be described with reference to FIG. 6. FIG. 6 is a flow chart of the motor drive control process executed by the control unit 6.

When the control unit 6 starts the motor drive control process upon receiving, from an exterior, a command for rotating the motor 2, control proceeds to S110, where the control unit 6 obtains a target rotation angle Do, the PWM frequency Sf, the steady-state Duty, and the braking-state Duty.

The target rotation angle Do corresponds to timing (angle) of starting the braking control. However, the target rotation angle Do does not necessarily indicate the target angle at the timing of the completely stopping of the rotation. The above is true because the motor 2 will not stop rotation immediately after the execution of the braking control, and thereby the motor 2 continues rotating by inertia until the motor 2 completely stops rotation even after the braking control is started. As a result, in a case, where the target rotation angle Do is alternatively set to correspond to an angle, at which the motor 2 completely stops, it is required to set the alternative target rotation angle Do to a value that includes an inertia rotation amount, by which the motor 2 rotates during the period from the start of the braking control to the complete stop.

When the above values are obtained, control proceeds to S120, where the motor rotation control is executed. In other words, the drive switch MOS is PWM-controlled with the steady-state Duty (ratio of 5:5 in the present embodiment).

Then, control proceeds to S130, where the direct-current application control signal Sdc of H level is outputted to the direct-current power source switch 4 in order to turn on the direct-current power source switch 4. Thus, the direct-current voltage of the direct-current power source 3 is applied to the motor 2. As a result, the motor 2 starts rotating.

Then, control proceeds to S140, where it is determined whether the rotation pulse Sp is detected. In other words, it is determined at S140 whether the rotation pulse Sp is received from the signal processing unit 22. When the rotation pulse Sp is detected, corresponding to YES at S140, control proceeds to S150, where the rotation angle D is computed based on the rotation pulse Sp.

It should be noted that the rotation angle D is computed based on a count value (or the number) of the rotation pulses Sp. Although it is not shown in the drawing, the rotational speed is also computed based on the intervals (cycles) of outputting the rotation pulse Sp.

After the rotation angle D is computed at S150, control proceeds to S160, where it is determined whether the rotation angle D is equal to the target rotation angle Do. The process at S140 to S150 is repeated until the rotation angle D reaches the target rotation angle Do. When the rotation angle D reaches the target rotation angle Do, corresponding to YES at S160, control proceeds to S170, where the braking control is started in order to brake the motor 2. In other words, the drive switch MOS starts being PWM-controlled with the braking-state Duty (the ratio of 1:9 in the present embodiment) at S170.

After the braking control is started at S170, control proceeds to S180, where it is determined whether y seconds have elapsed since the time of starting the braking control at S170. The y seconds correspond to a sufficient time required for completely stopping the motor 2 since the time of starting the braking control. Thus, the determination process at S180 determines whether the motor 2 has completely stops rotation.

When it is determined at S180 that the y seconds have not elapsed since the time of starting the braking control, control proceeds to S190, where it is determined, similarly to S140, whether the rotation pulse Sp is detected. Then, when the rotation pulse Sp is detected, corresponding to YES at S190, control proceeds to S200, where the rotation angle D is computed, in a manner similar to S150. Then, control returns to S180.

When y seconds have elapsed since the time of starting the braking control at S170, corresponding to YES at S180, control proceeds to S210, where the direct-current application control signal Sdc of L level is outputted to the direct-current power source switch 4 in order to turn off, the direct-current power source switch 4. As above, the application of the direct-current voltage to the motor 2 is prohibited. Then control proceeds to S220, where a stop control for turning off the drive switch MOS is executed to end the motor drive control process.

As described above, in the rotation detecting system 1 of the present embodiment, the motor 2 is configured such that the capacitor C1 for detecting the rotation angle is provided in parallel to the first phase coil L1 among the three phase coils L1, L2, L3. As a result, the impedance of the motor circuit changes in two steps for every 180-degree rotation. In the states C, C', because the capacitor C1 is arranged to be directly connected between the brushes 16, 17, the pulse electric current is generated at the moment of turning on or off the drive switch MOS.

The control unit 6 PWM-controls the motor 2 during the full period from the start to the stop of the motor 2. As a result, when the rotation angle of the motor 2 is at a position that corresponds to the states C, C' during the full period from the start to the stop, the pulse electric current is periodically generated. In contrast, when the rotation angle of the motor 2 is at a position that corresponds the states A, A', B, B' that have the higher impedance, the pulse electric current is not generated. Thus, a signal processing unit 33 detects the pulse electric current contained in the motor electric current and generates the rotation pulse Sp accordingly to the detected pulse electric current. Then, the control unit 6 detects the rotational state, such as the rotation angle D and the rotational speed, based on the rotation pulse Sp.

As a result, according to the rotation detecting system 1 of the present embodiment, it is possible to reliably detect the rotation angle D and the rotational speed during the full period from the start to the stop of the motor 2. Furthermore, the rotation angle D is detected based on the existence of the pulse voltage caused by the PWM control, and thereby it is possible to execute the above detection without influencing the motor drive. Thus, it is possible to accurately detect the rotation angle regardless of the rotational speed without providing the dedicated and extensive sensor, such as a rotary encoder.

In the method described in JP-A-2003-111465, detection is made based on the change in the direct current caused by the resistor. As a result, when the direct current supplied to the motor becomes smaller during the deceleration or stopping, the change in the direct current becomes smaller accordingly. As a result, it is impossible to execute the detection.

In contrast, in the present embodiment, the detection is made based on the alternating-current component caused by the PWM control, and thereby it is possible to reliably detect the rotational state of the motor 2 regardless of the rotational speed of the motor 2 provided that the PWM control is executed (or provided that the switch MOS is turned on and off).

Also, in the method described in JP-A-2003-111465, the resistor is connected with one of the phase coils in order to generate the change in the direct current supplied to the motor circuit. As a result, the torque of the motor inevitably changes with the change in the electric current. The above change in the motor torque may cause the noise of the motor, or may cause the noise of the target object that is driven by the motor.

In contrast, in the present embodiment, the capacitor C1 is provided in parallel to the first phase coil L1 in order to generate the change in the impedance in accordance with the rotation of the motor 2. Because the capacitor C1 has the high impedance for the direct electric current, the existence of the capacitor C1 is negligible. As a result, although the capacitor C1 is provided for detecting the rotation, the capacitor C1 does not influence or unwantedly change the torque of the motor 2. Therefore, the rotation detecting system 1 of the present embodiment is advantageous over the method described in JP-A-2003-111465.

Also, in the present embodiment, the rotational state is detected based on the alternating-current component supplied to the motor 2. However, for example, an additional alternating-current power source may be alternatively provided, and the alternating-current component may be alternatively superimposed on the motor 2 from the alternating-current power source through, for example, a coupling capacitor.

However, the above method that requires the additional alternating-current power source causes the higher production cost and also increases the size in the apparatus configuration because the alternating-current power source has to be installed. Furthermore, specially for a middle-size or large-size motor, the impedance of the motor is reduced, and thereby it is difficult to superimpose the alternating-current component through the coupling capacitor.

In contrast, in the method of the present embodiment, in which the rotational state is detected based on the alternating-current component caused by the PWM control, it is possible to generate the alternating-current component without installing the additional alternating-current power source. As a result, the above various disadvantages will not occur in the present embodiment.

Second Embodiment

Figure 7:
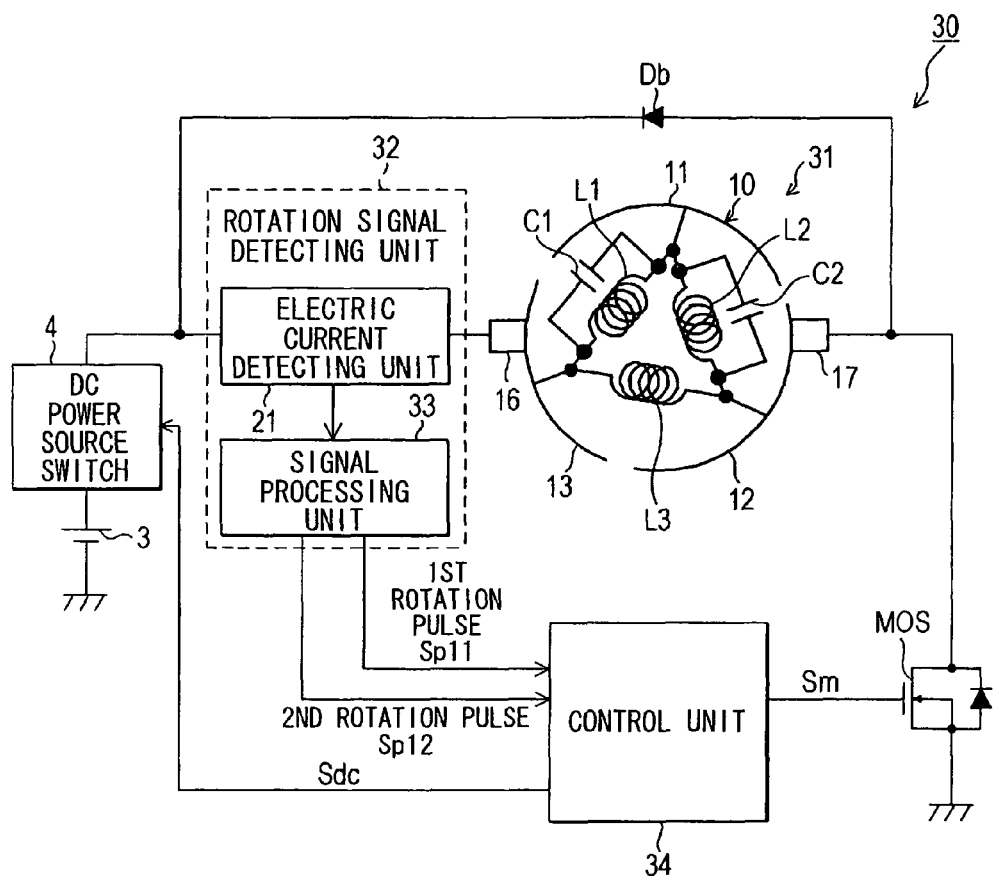
FIG. 7 is a diagram illustrating a schematic configuration of a rotation detecting system according to the second embodiment of the present invention.

FIG. 7 shows a schematic configuration of a rotation detecting system 30 according to the second embodiment. The rotation detecting system 30 of the present embodiment is configured to detect the rotation angle and the rotational speed of a target motor 31 similarly to the first embodiment. Furthermore, the rotation detecting system 30 is configure to detect a rotational direction of the motor 31.

The rotation detecting system 30 of the present embodiment includes the direct-current power source 3 and the electric current detecting unit 21. The direct-current power source 3 applies direct-current voltage to the motor 31 for driving the motor 31, and the electric current detecting unit 21 is provided between the direct-current power source switch 4 and the motor 31. Also, similar to the rotation detecting system 1 of the first embodiment, the drive switch MOS is provided in the route between the motor 31 and the ground, and the drive switch MOS is PWM-controlled by a control unit 34 during the full period from the start to the stop of the motor 31. Also, similar to the first embodiment, in the PWM control, the drive switch MOS is controlled with the steady-state Duty (5:5) during the period from the start to the steady rotation state. Also, the drive switch MOS is controlled with the braking-state Duty (1:9) during the period of the braking control state.

Therefore, components of the second embodiment similar to those in the first embodiment are indicated by the same numerals used in the first embodiment, and the explanation thereof will be omitted. In the present embodiment, the configuration different from the rotation detecting system 1 of the first embodiment will be mainly described.

In the rotation detecting system 30 of the present embodiment, the motor 31 has a configuration, in which the capacitor C1 is provided in parallel to the first phase coil L1, and a capacitor C2 is further provided in parallel to the second phase coil L2. A capacitance value of the capacitor C2 is different from a capacitance value of the capacitor C1.

Thus, when the commutator segments that contact the respective brushes 16, 17 switch during the 180-degree rotation of the motor 31, the value of the impedance of the motor circuit changes accordingly. In other words, when the motor circuit between the brushes 16, 17 changes, the value of the impedance of the motor circuit changes accordingly. More specifically, in the first embodiment, as shown in FIGS. 2A to 2C, although the motor circuit changes between the three states A to C during the 180-degree rotation, the impedance changes in two steps between (a) the high impedance at the states A, B and (b) the low impedance at the state C. However, in the present embodiment, when the motor circuit changes between the three states, the impedance changes between the three different values accordingly. In other words, the impedance of the motor circuit changes in three steps during the 180-degree rotation.

The change in the impedance of the motor circuit at each of the states A, B, C will be described with reference to FIGS. 8A to 8D. FIGS. 8A to 8C show the change of the motor circuit formed between the brushes 16, 17 during the 180-degree rotation of the motor 31. In other words, FIGS. 8A to 8C show the change of the connection state between the brushes 16, 17 within the motor 31 during the 180-degree rotation of the motor 31. As shown in FIGS. 8A to 8C, the motor circuit of the motor 31 of the present embodiment changes between mainly three states, such as the state A (FIG. 8A), the state B (FIG. 8B), and the state C (FIG. 8C), during the 180-degree rotation of the motor 31.

In the state A as shown in FIG. 8A, because there is formed a route, which has only the capacitor C2, between the brushes 16, 17, there is formed between the brushes 16, 17 a parallel resonant circuit of (a) the capacitor C2 and (b) the combined inductance provided in parallel to the capacitor C2. As a result, the impedance between the brushes at the state A has a parallel resonance characteristic, in which a frequency fd serves as a resonance frequency as shown in FIG. 8D.

In the state B as shown in FIG. 8B, the armature has further rotated clockwise about 50 degrees from the state A. In the state B, a series circuit of the capacitor C1 and the capacitor C2 is formed between the brushes. As a result, there is formed between the brushes a parallel resonant circuit of (a) the combined capacity of the capacitors C1, C2 that are connected in series with each other and (b) the combined inductance provided in parallel to the capacitors C1, C2. Therefore, the impedance of the parallel resonant circuit formed in the state B has the parallel resonance characteristic, in which a frequency fg serves as the resonance frequency as shown in FIG. 8D. The resonance frequency fg at the state B is higher than the resonance frequency fd at the state A.

In the state C as shown in FIG. 8C, the armature has further rotated clockwise about 50 degrees from state B. In the state C, because there is formed a route, which has only the capacitor C1, there is formed between the brushes a parallel resonant circuit of (a) the capacitor C1 and (b) the combined inductance provided in parallel to the capacitor C1. As a result, the impedance between the brushes in the state C has a parallel resonance characteristic, in which a frequency fe serves as the resonance frequency as shown in FIG. 8D. the resonance frequency fe at the state C is higher than the resonance frequency fd at the state A, and is lower than the resonance frequency fg at the state B.

In the present embodiment, similar to the first embodiment, the PWM frequency Sf for the PWM control is set higher than the resonance frequency fg at the state B. As a result, the impedance of the motor circuit of the motor 31 becomes the highest during the period of the state A, the lowest during the period of the state B, and in the middle of values of the state A and the state B during the period of the state C.

In other words, in the motor 31 of the present embodiment, the impedance of the motor circuit changes in three steps in accordance with the rotation. Also, there is always formed the route, which has only the capacitor, between the brushes at any one of the states A, B, C with the different capacitance values of the route.

Figure 9:
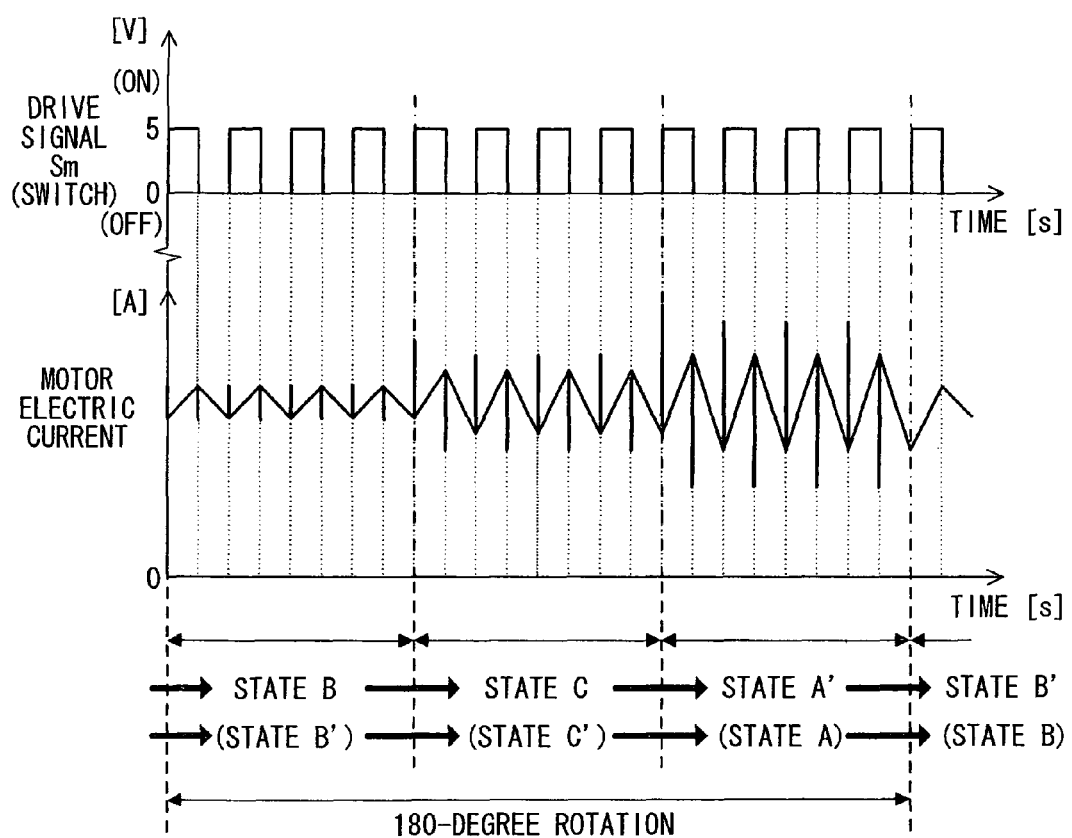
FIG. 9 is a diagram illustrating one example of a motor electric current waveform during rotation of the motor of the second embodiment.

Thus, the pulse electric current is generated at the time of turning on and off of the drive switch MOS in any one of the states A, B, and C. More specifically, as shown in the example of FIG. 9, the pulse electric current is the smallest during the state B, in which the impedance is the largest. Also, the pulse electric current is the largest during the state A, in which the impedance is the smallest. The pulse electric current is intermediate between the magnitudes of the pulse electric currents in the states A and B during the state C, in which the impedance is intermediate between the impedances at the state A and the state B.

In other words, the amplitude of the pulse alternating-current component, which is contained in the motor electric current that is fed to the motor 31, changes between a small amplitude, a medium amplitude, a large amplitude in this order while the motor 31 rotates in the constant direction.

Figure 10A:
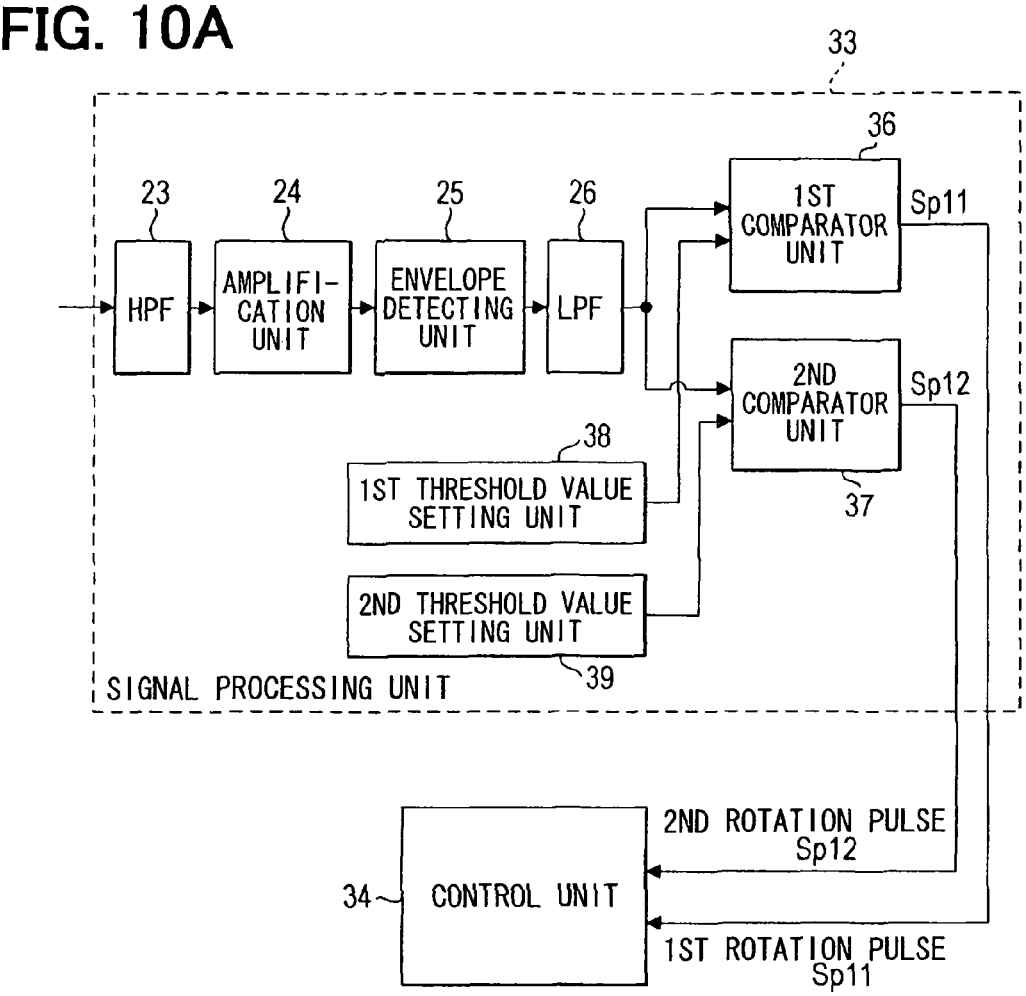
FIG. 10A is an explanatory diagram for explaining a configuration of a signal processing unit of the second embodiment.

Thus, in the rotation detecting system 30 of the present embodiment, the signal processing unit 33 of a rotation signal detecting unit 32 includes two threshold value setting units 38, 39 and two comparator units 36, 37 as shown in FIG. 10A. The comparator unit 36 is configured to output a first rotation pulse Sp11, and the comparator unit 37 is configured to output a second rotation pulse Sp12.

In other words, the signal processing unit 33 shown in FIG. 10A includes the HPF 23, the amplification unit 24, the envelope detecting unit 25, and the LPF 26, similarly to the signal processing unit 22 of the first embodiment shown in FIG. 4. In the signal processing unit 33 of the present embodiment, the envelope signal outputted from the LPF 26 is fed to the first comparator unit 36 and the second comparator unit 37.

The first comparator unit 36 compares the fed envelope signal with a first threshold value set by a first threshold value setting unit 38 and outputs a rotation pulse (the first rotation pulse Sp11) based on the comparison result similarly to the comparator unit 28 of the first embodiment.

The second comparator unit 37 compares the fed envelope signal with a second threshold value set by a second threshold value setting unit 39 and outputs a rotation pulse (second the rotation pulse Sp12) based on the comparison result.

The first threshold value and the second threshold value are set to the values as follows. Firstly, definitions of a small envelope signal, a medium envelope signal, and a large envelope signal are described. The small envelope signal is defined as an envelope signal obtained by the envelope detecting unit 25 when the alternating-current component of the detection signal has a small amplitude, which corresponds to the state B. The medium envelope signal is defined as an envelope signal obtained by the envelope detecting unit 25 when the alternating-current component has a medium amplitude, which corresponds to the state C. The large envelope signal is defined as an envelope signal obtained by the envelope detecting unit 25 when the alternating-current component has a large amplitude, which corresponds to the state A. In the above definition, first threshold value is a predetermined value that is greater than the small envelope signal and smaller than the medium envelope signal. The second threshold value is a predetermined value greater than the medium envelope signal and smaller than large envelope signal.

As a result, in the comparison of the envelope signal from the envelope detecting unit 25 with the first threshold value in the first comparator unit 36, for example, if the envelope signal is smaller than the first threshold value, the envelope signal is determined as the small envelope signal. When the envelope signal is greater than the first threshold value, the envelope signal is determined as the medium envelope signal or the large envelope signal. In the above case, in the comparison of the envelope signal with the second threshold value in the second comparator unit 37, if the envelope signal is smaller than the second threshold value, the envelope signal is determined as the medium envelope signal, and if the envelope signal is greater than the second threshold value, the envelope signal is determined as the large envelope signal.

More specifically, the magnitude of the first threshold value and the second threshold value are determined such that it is possible to determine the envelope signal corresponds to which one of the small envelope signal, the medium envelope signal, and the large envelope signal. As a result, it is possible to reliably detect the timing of switching the commutator segments (or the timing of switching the motor circuit) when the switch (or the change) occurs, and thereby it is possible to reliably generate the rotation pulses Sp11, Sp12. Thereby, it is possible to detect the rotation angle having the resolution higher than the resolution in the first embodiment.

Figure 10B:
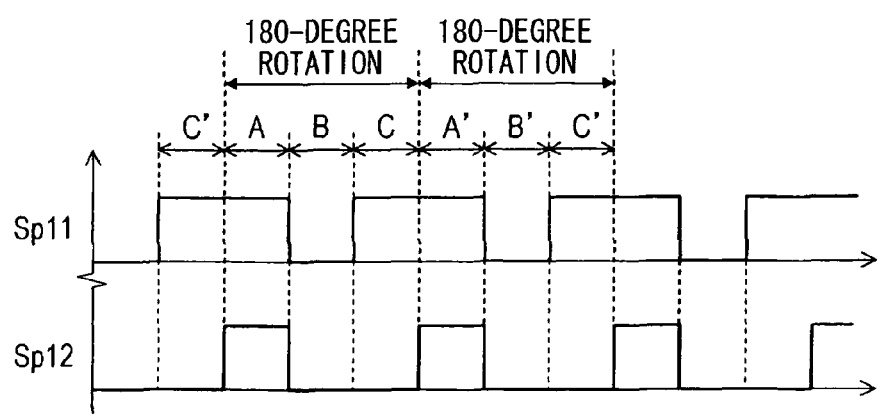
FIG. 10B is an explanatory diagram for explaining an operation of the signal processing unit of the second embodiment.

FIG. 10B shows one example of the rotation pulses Sp11, Sp12. As shown in FIG. 10B, the first rotation pulse Sp11 is outputted during the period of the states A, C, in which the alternating-current component becomes the medium amplitude and the large amplitude. The second the rotation pulse Sp12 is outputted during the period of the state A, in which the alternating-current component becomes the large amplitude.

Also, in the present embodiment, the amplitude of the alternating-current component changes from the small, the medium, to the large in this order when the contact state of the commutator segments changes during the 180-degree rotation. As a result, it is possible to detect the rotational direction of the motor 31 based on the change pattern of the amplitude.

More specifically, as is apparent from FIG. 10B, for example, when a rotation angle of the motor 31 corresponds to the state A and simultaneously both the rotation pulses Sp11, Sp12 are outputted, it is possible to detect the rotational direction of the motor 31 depending on whether the second rotation pulse Sp12 is not outputted subsequently, or whether both the rotation pulses Sp11, Sp12 are not outputted subsequently. Also, for example, when the rotation angle of the motor 31 corresponds to the state B and simultaneously both the rotation pulses Sp11, Sp12 are not outputted, it is possible to detect the rotational direction of the motor 31 depending on whether the first rotation pulse Sp1 is exclusively outputted, or whether both the rotation pulses Sp11, Sp12 are outputted.

As a result, the control unit 34 of the present embodiment is configured to detect the rotational direction of the motor 31 based on the two rotation pulses, such as the first rotation pulse Sp11 and the second rotation pulse Sp12, inputted from the signal processing unit 33 as above.

Thus, for example, even if the motor 31 erroneously rotates in a reverse direction immediately before the motor 31 stops, it is possible to detect the reverse rotation of the motor 31, and thereby it is possible to reflect the detection to the computation result of the rotation angle D.

It should be noted that it is possible to compute the rotation angle D and the rotational speed by using any one of the first rotation pulse Sp11 and the second rotation pulse Sp12 similarly to the first embodiment. Alternatively, it is possible to more accurately compute the rotation angle D and the rotational speed of higher resolution based on both the rotation pulses Sp11, Sp12.

According to the rotation detecting system 30 of the present embodiment, in the motor 31, the capacitors C1, C2 have capacitance values different from each other. The capacitor C1 is provided in parallel to the first phase coil L1, and the capacitor C2 is provided in parallel to the second phase coil L2. Due to the above configuration, when the commutator segments that contact the respective brushes 16, 17 are switched in accordance with the rotation, the amplitude of the alternating-current component (pulse electric current) generated at the timing of turning on and off the drive switch MOS changes between different magnitudes. As a result, it is possible to detect the rotation angle D and the rotational speed with the higher resolution, and also it is further possible to detect the rotational direction. Thus, it is possible to detect the reverse rotation of the motor 31, which is likely to occur when the motor 31 is about to stop. As a result, it is possible to more precisely detect the rotation angle D in consideration of the rotational direction.

Third Embodiment

Figure 11:
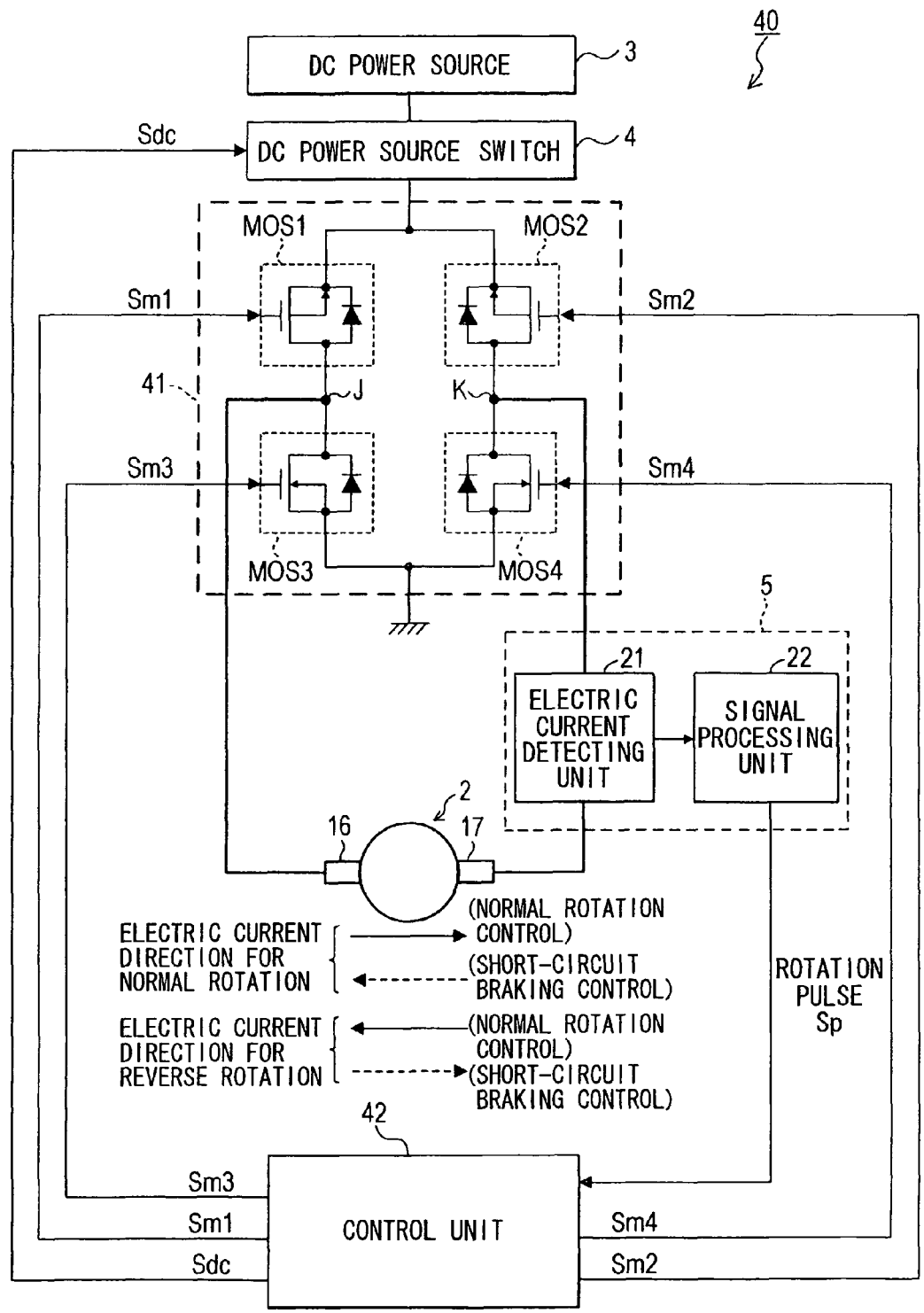
FIG. 11 is a diagram illustrating a schematic configuration of a rotation detecting system according to the third embodiment of the present invention.

FIG. 11 shows a schematic configuration of a rotation detecting system 40 of the third embodiment. The rotation detecting system 40 of the present embodiment is also configured to detect the rotation angle of the motor 2 similar to the rotation detecting system 1 of the first embodiment shown in FIG. 1. The rotation detecting system 40 includes the direct-current power source 3, the rotation signal detecting unit 5, and the direct-current power source switch 4 similarly to the first embodiment. As above, the direct-current power source 3 applies the direct-current voltage to the motor 2 in order to drive the motor 2. The rotation signal detecting unit 5 generates the rotation pulse Sp based on the electric current supplied to the motor 2.

Thus, components of the present embodiment similar to those in the first embodiment are indicated by the same numerals used in the first embodiment, and the explanation thereof will be omitted. Thus, the configuration of the present embodiment different from the rotation detecting system 1 of the first embodiment will be mainly described below.

In the rotation detecting system 40 of the present embodiment, the direct-current power source 3 supplies the electric power, to the motor 2 via a motor driver 41. The motor driver 41 has a known H bridge circuit (or referred to as a full bridge) configuration having four switches.

More specifically, the motor driver 41 includes a first drive switch MOS1, a second drive switch MOS2, a third drive switch MOS3, and a fourth drive switch MOS4. The drive switches MOS1, MOS2, each of which is a P-channel MOSFET, are located on a high side, and the drive switches MOS3, MOS4; each of which is an N-channel MOSFET, are located on a low side. The sources of the drive switches MOS1, MOS2 are connected to the direct-current power source 3 via the direct-current power source switch 4, and the sources of the drive switches MOS3, MOS4 are grounded. Also, the drain of the high-side first drive switch MOS1 is connected to the drain of the low-side third drive switch MOS3 at a connection point (a midpoint J of the H bridge circuit) that is connected with the brush 16 of the motor 2. Similarly, the drain of the second drive switch MOS2 located on the high side is connected to the drain of the fourth drive switch MOS4 located on the low side at a connection point (the other midpoint K of the H bridge circuit) that is connected with the other brush 17 of the motor 2.

The gates of the drive switches MOS1 to MOS4 are respectively fed with drive signals Sm1 to Sm4 from a control unit 42, and the drive switches MOS1 to MOS4 are turned on and off based on the respective drive signals fed to the base thereof.

As above, because the rotation detecting system 40 includes the motor driver 41, it is possible to switch the rotation of the motor 2 between a normal rotation and a reverse rotation by using the motor driver 41. More specifically, in order to rotate the motor 2 in the normal rotation, the followings are simultaneously executed: the direct-current power source switch 4 is turned on, the first drive switch MOS1 and the fourth drive switch MOS4 of the motor driver 41 are turned on, and the second drive switches MOS2, MOS3 of the motor driver 41 are turned off. Due to the above operation, the direct-current voltage from the direct-current power source 3 is applied to the motor 2 through the motor driver 41, and the motor 2 starts rotating in the normal direction. During the normal rotation, the motor electric current flows in a direction from the brush 16 to the brush 17 in the motor 2 as shown in FIG. 11 only during the period from the start to the steady rotation state.

In contrast, in order to rotate the motor 2 in the reverse rotation, the followings are executed simultaneously: the second drive switch MOS2 and the third drive switch MOS3 of the motor driver 41 are turned on, and the drive switches MOS1, MOS4 of the motor driver 41 are turned off. Due to the above, the motor electric current flows in a direction from the brush 17 to the brush 16 in the motor 2 as shown in FIG. 11, and thereby the motor 2 starts rotating in the reverse direction only during the period from the start to the steady rotation state.

As above, by switching the drive switch that is to be turned on, it is possible to change the rotational direction of the motor 2 between the normal rotation and the reverse rotation. In the present embodiment, similarly to the above embodiments, the drive switches MOS1 to MOS4 are PWM-controlled during the full period from the start to the stop in order to detect the rotation angle of the motor 2.

Specifically, the control is switched with a predetermined Duty between a first drive switch control and a second drive switch control in order to control the rotation in a designated direction. For example, in the first drive switch control, a designated direction energization for energizing the motor driver 41 is executed such that the motor 2 rotates in a designated direction, which is a wanted direction. The first drive switch control corresponds to an energization control. Also, in the second drive switch control, a short-circuit energization for establishing a short circuit between the brushes 16, 17 is executed. The second drive switch control corresponds to a short-circuit control.

The first drive switch control is a drive switch control for causing the rotation in the designated rotational direction. For example, when it is designated to rotate the motor 2 in a normal direction for the normal rotation, the first drive switch MOS1 and the fourth drive switch MOS4 are turned on, and the drive switches MOS2, MOS3 are turned off such that the energization for the normal rotational direction is operated. Also, when it is designated to rotate the motor 2 in a reverse direction for the reverse rotation, the second drive switch MOS2 and the third drive switch MOS3 are turned on, and the drive switches MOS1, MOS4 are turned off such that the energization for the reverse rotational direction is operated.

In contrast, in the second drive switch control, both the drive switches MOS3, MOS4, which are located on the low side, are turned on, and both the drive switches MOS1, MOS2, which are located on the high side, are turned off.

As above, the control is switched between the first drive switch control (energization control) and the second drive switch control (short-circuit control) with the predetermined Duty (steady-state Duty) during the period from the start to the steady rotation state such that an energization amount for the designated direction is controlled. As a result, the rotation in the designated direction is controlled. In the present embodiment, the energization control and the short-circuit control are PWM-controlled with a steady-state Duty of, for example, 9:1.

Figure 12:
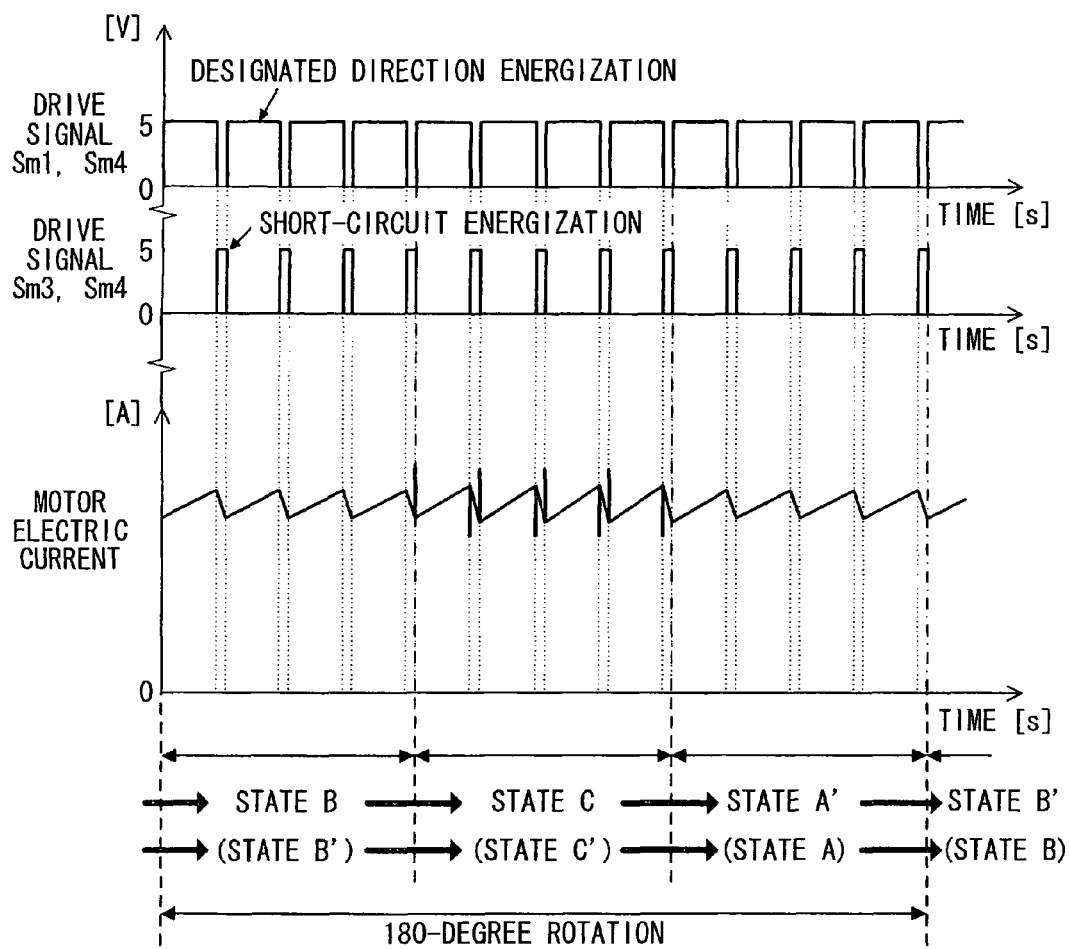
FIG. 12 is a diagram illustrating one example of a motor electric current waveform made during rotation of the motor of the third embodiment.

Thus, as shown in a waveform example during the steady rotation in FIG. 12, for example, when it is designated to rotate in the normal rotational direction, the energization control for the designated direction energization and the short-circuit control for the short-circuit energization are switched with the Duty of 9:1. For example, the designated direction corresponds to the normal rotational direction.

Figure 13:
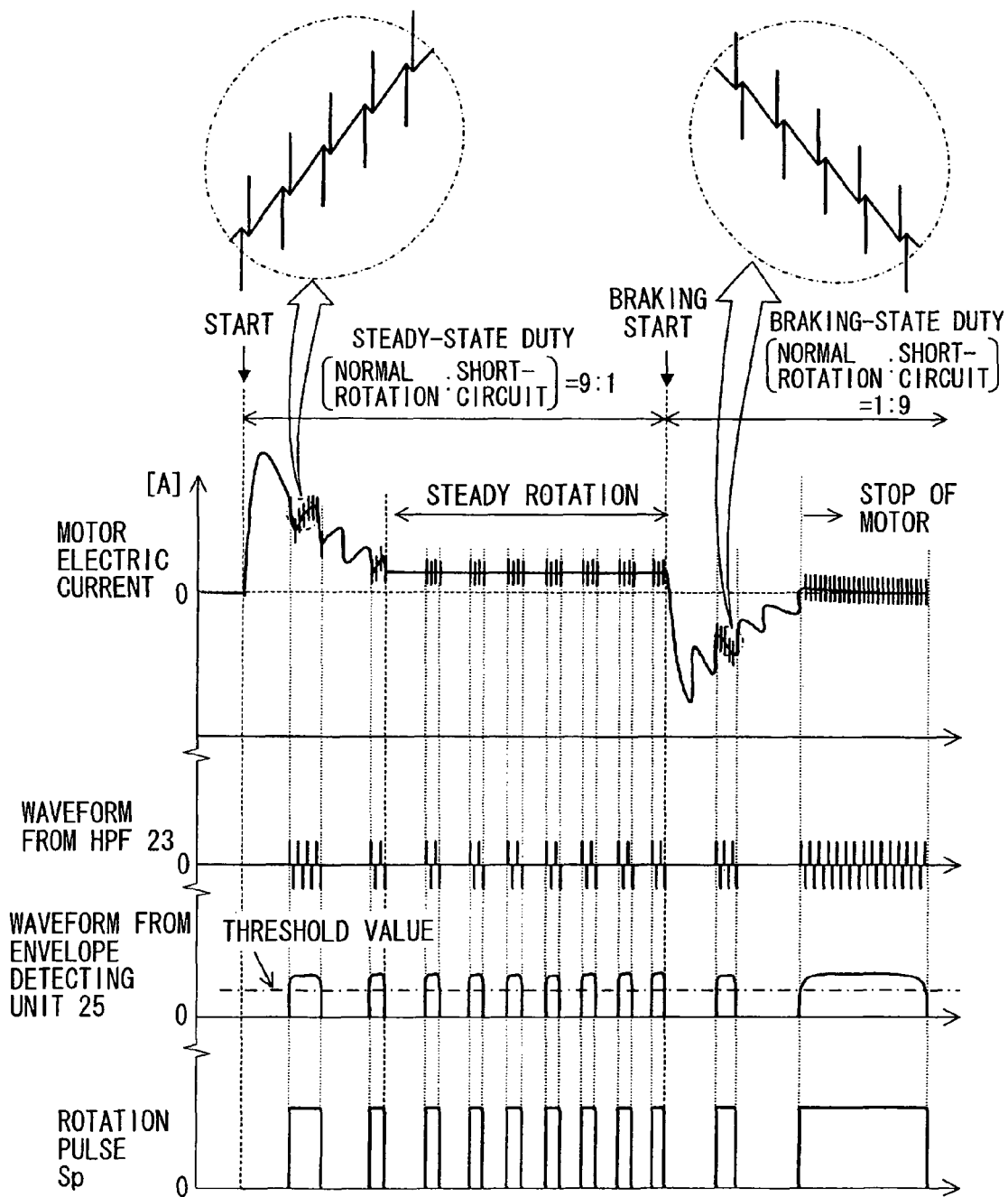
FIG. 13 is an explanatory diagram for explaining a signal processing unit of the third embodiment.

As a result, the motor electric current fluctuates in accordance with the switching timing during the steady rotation as shown in FIGS. 12 and 13. Thus, similarly to the first embodiment, in the state C, where there is formed an energization route, which only has the capacitor C1, between the brushes 16, 17, the pulse electric current is generated due to the charge and discharge of the capacitor C1 immediately after the timing of turning on and off the drive switches. More specifically, in the present embodiment, immediately after the timing of turning on and off the first drive switch MOS1 and the fourth drive switch MOS4, the pulse electric current is generated. It should be noted that in the present embodiment, because the steady-state Duty during the steady rotation is set to 9:1, the timing of generating the pulse electric current is based on the steady-state Duty as shown in FIGS. 12 and 13.

Also, during the period of the braking control state, similarly to during the steady rotation, the control is switched between the energization control and the short-circuit control with the other predetermined Duty (braking-state Duty). The braking-state Duty is determined to a ratio (or a certain value) such that the motor 2 is successfully stopped. Specifically, in the present embodiment, the above switching control is executed with the Duty of 1:9.

As a result, as shown in FIG. 13, the motor electric current fluctuates in accordance with the switching timing during the period of the braking control state. Also, during the period of the braking control state, the pulse electric current is generated immediately after the turning on and off the route drive switch due to the charge and discharge of the capacitor C1 in the state C, where there is formed the energization path, which only has the capacitor C1, between the brushes 16, 17.

The signal processing unit 22 generates the rotation pulse Sp through the various signal processing (series of processes from the HPF 23 to the comparator unit 28) based on the pulse electric current caused by the above PWM control. Then, based on the generated rotation pulse Sp, the control unit 42 detects the rotation angle and the rotational speed in a method identical with the method of the control unit 6 of the first embodiment.

Figure 14:
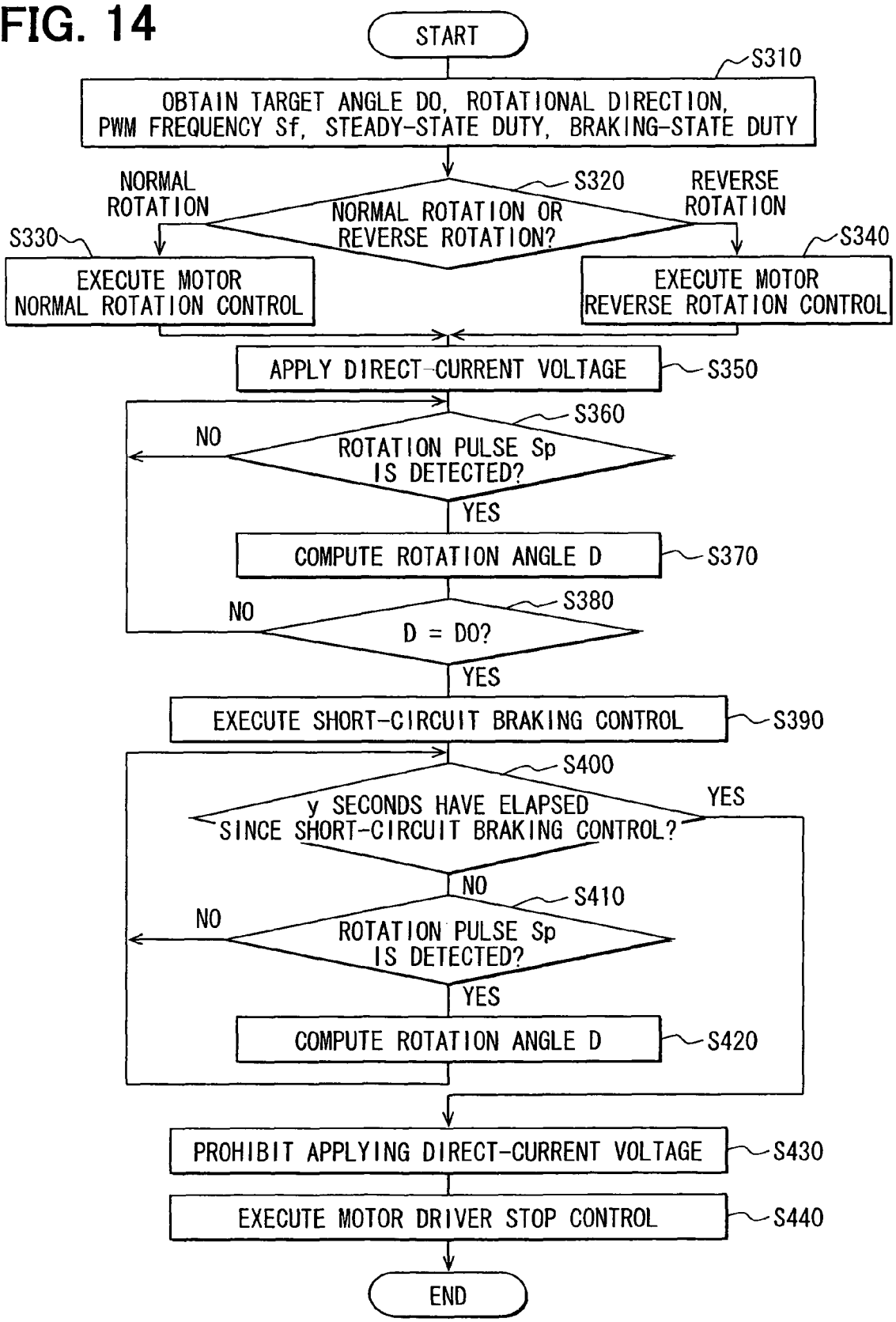
FIG. 14 is a flow chart illustrating a motor drive control process of the third embodiment.

Next, a motor drive control process executed by the control unit 42 of the present embodiment will be described with reference to a flow chart in FIG. 14. When the motor drive control process of FIG. 14 is started, the control unit 42 obtains firstly; at S310, the target rotation angle Do, the rotational direction, the PWM frequency Sf, the steady-state Duty, and the braking-state Duty.

Then, control proceeds to S320, where the control unit 42 determines the rotational direction. The above determination is based on the rotational direction obtained at S310. When the obtained rotational direction is the normal direction, control proceeds to S330, and when the obtained rotational direction is the reverse direction, control proceeds to S340.

When control proceeds to S330, the control unit 42 executes a motor normal rotation control. More specifically, the control is switched between (a) the normal energization control and (b) the short-circuit control with the steady-state Duty (the ratio is 9:1 in the present embodiment) under the PWM control. For example, in the normal energization control for energizing in the normal rotational direction (designated direction), the first drive switch MOS1 and the fourth drive switch MOS4 are turned on. In the short-circuit control for energizing for establishing the short-circuit, the third drive, switch MOS3 and the fourth drive switch MOS4 are turned on. Then, control proceeds to S350, where the direct-current voltage is applied.

Due to the above, as shown in FIGS. 12 an 13, the control is switched between the energization control and the short-circuit control with the steady-state Duty of 9:1 in order to rotate the motor 2 in the normal direction (or to cause the normal rotation of the motor 2).

In contrast, when control proceeds to S340, the control unit 42 executes a motor reverse rotation control. More specifically, the control is switched between (a) the reverse energization control and (b) the short-circuit control with the steady-state Duty of 9:1 under the PWM control. For example, in the reverse energization control for energizing in the reverse rotational direction, the second drive switch MOS2 and the third drive switch MOS3 are turned on. In the short-circuit control for establishing the short-circuit, the third drive switch MOS3 and the fourth drive switch MOS4 are turned on. Then, control proceeds to S350, where the direct-current voltage is applied.

Due to the above, similarly to the case of the normal rotation, the control is switched between the energization control and the short-circuit control with the steady-state Duty of 9:1 in order to control the motor 2 at the reverse rotation (or to cause the motor 2 to rotate in the reverse direction). Also, similarly to S140 to S160 in the motor drive control process of the first embodiment shown in FIG. 6, the rotation angle D is kept computed until the rotation angle D becomes equivalent to the target rotation angle Do (S360 to S380).

When the rotation angle D of the motor 2 reaches the target rotation angle Do, corresponding to YES at S380, control proceeds to S390, where, a short-circuit braking control is executed. More specifically, the energization control for the designated direction energization and the short-circuit control for the short-circuit energization are switched with the braking-state Duty (ratio is 1:9 in the present embodiment) under the PWM control. Due to the above, the rotational speed of the motor 2 is gradually reduced.

Then, control proceeds to S400, where it is determined whether y seconds have elapsed since the start of the short-circuit braking control at S390. The rotation angle D is kept computed every time the rotation pulse Sp is detected until y seconds have elapsed (S410 to S420). When it is determined that y seconds have elapsed, corresponding to YES at S400, control proceeds to S430, where the direct-current power source switch 4 is turned off, and thereby the application of the direct-current voltage is stopped. Furthermore, control proceeds to S440, where, a motor driver stop control is executed to turn off all of the drive switches MOS1 to MOS4, and the motor drive control process is ended.

Similarly to the rotation detecting system 1 of the first embodiment, the rotation detecting system 40 of the present embodiment is capable of accurately detecting the rotation angle regardless of the rotational speed without installing a dedicated and intensive sensor, such as the rotary encoder, and without causing the torque variation.

As in the present embodiment, because the H bridge circuit is employed, it is possible to realize a simple drive circuit configuration, and also it is possible to achieve both of the functions (a) for establishing the short circuit across the direct-current motor and (b) for switching the rotational directions.

(Modification)

The embodiment of the present invention is not limited to the above embodiments. However, the present invention may be modified in various manners provided that the modification is within the technical range of the present invention.

The motors 2, 31 of the above embodiments are merely examples of the present invention. Thus, the present invention may be applicable to any configuration of a motor provided that the impedance periodically changes in accordance with the rotation, and also that the amplitude of the alternating-current component contained in the motor electric current changes with the change of the impedance.

For example, an inductance element or a resistive element may be connected to one or more of the phase coils. Also, the resistive element, the inductance element, and the capacitor may be combined as required.

Figure 15:
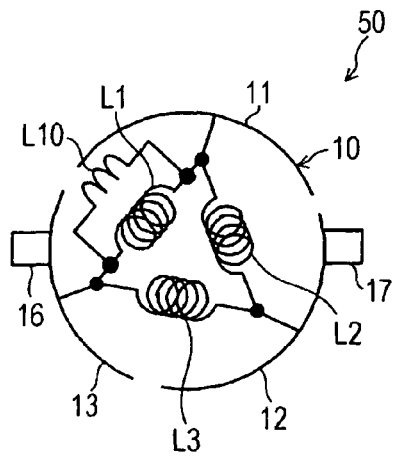
FIG. 15 is an explanatory diagram illustrating a motor to be detected according to the other embodiment of the present invention.

In a motor 50 shown in FIG. 15, an inductance element (coil) L10 is provided in parallel to the first phase coil L1. As is apparent from the motor 2 of FIG. 1, the motor 50 is formed by replacing the capacitor C1 in the motor 2 of FIG. 1 with the inductance element L10.

Similarly to the motor 2 of the first embodiment, the motor circuit of the motor 50 changes in three steps with the switch of the brushes during the 180-degree rotation. In the state A, the first commutator segment 11 contacts one of the brushes 16, 17, and the second commutator segment 12 contacts the other one of the brushes 16, 17. In the state B, the second commutator segment 12 contacts one of the brushes 16, 17, and the third commutator segment 13 contacts the other one of the brushes 16, 17. In the state C, the third commutator segment 13 contacts one of the brushes 16, 17, and the first commutator segment 11 contacts the other one of the brushes 16, 17. Impedances between the brushes in the states A, B are equivalent to each other, but the impedance between the brushes in the state C is smaller than those in the state A, B.

Figure 16:
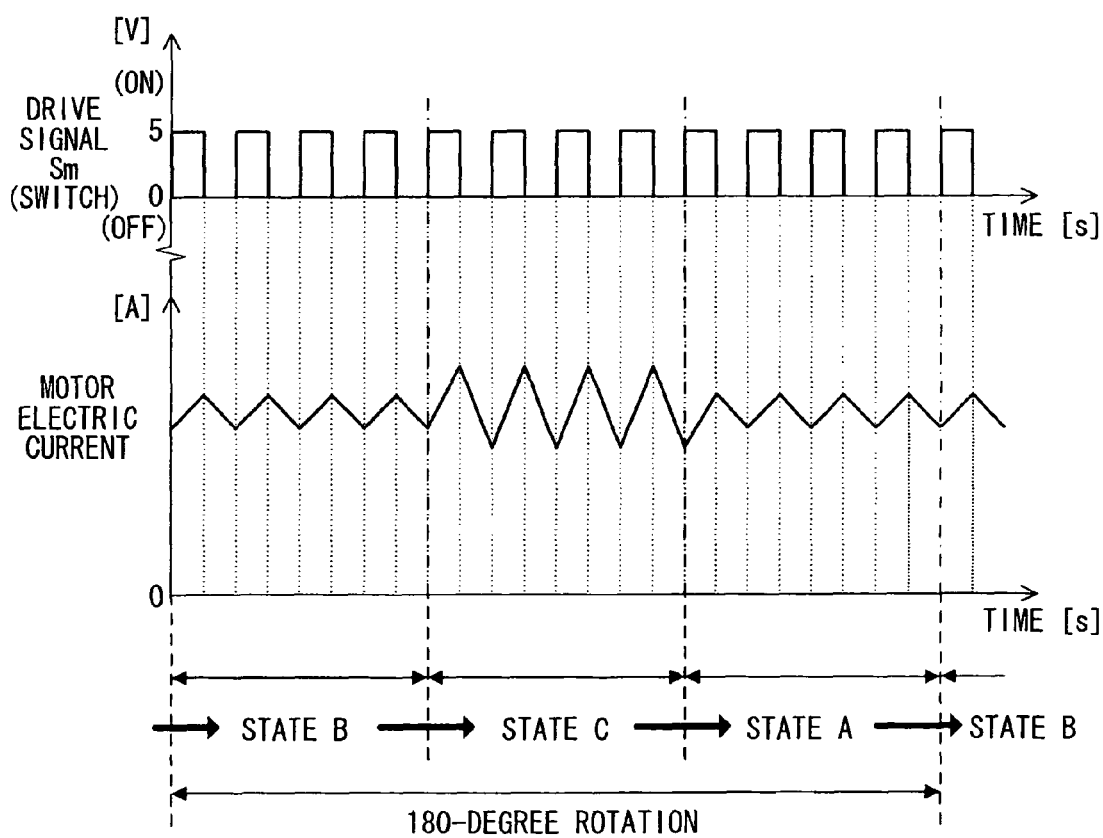
FIG. 16 is a diagram illustrating one example of a motor electric current waveform during rotation of the motor of FIG. 15.

Note that, although the impedance in the state C is small as above, there is not formed a route, which has only the capacitor C1, between the brushes unlikely to the state C of the motor 2 of the first embodiment (see FIG. 2). As a result, the pulse electric current is not generated in contrast to the state C of the first embodiment. However, in the present modification, the amplitude of the fluctuation (alternating-current component) of the motor electric current caused by the turning on and off of the drive switch in the PWM control changes with the change of the impedance. More specifically, as shown in FIG. 16, the fluctuation of the motor electric current in the state C, where the impedance is relatively small, has the amplitude greater than that of the fluctuation of the motor electric current in the states A, B, where the impedance is relatively large.

Thus, for example, the fluctuation component is extracted from the motor electric current by using the HPF and a band pass filter (BPF), and the signal of the extracted fluctuation component is processed similarly to the first embodiment, such as the amplification, and obtaining the envelope signal. Then, the envelope signal in accordance with the magnitude of the amplitude is obtained. Then, a predetermined threshold value is set to a value, which is greater than the envelope signal for the small amplitude, and which is smaller than the envelope signal for the large amplitude. Then, similar to the first embodiment, the rotation pulse Sp is generated based on the threshold value.

It should be noted that in the first embodiment, as is apparent from FIG. 3, the amplitude of the fluctuation of the motor electric current caused by the PWM control in the state C is different from the amplitude in the states A, B. Thus, also in the first embodiment, similarly to the case of the motor 50 described in FIG. 15, the rotation pulse Sp may be generated based on the amplitude' change of the fluctuation.

Also, the drive circuits for driving the motor in the above embodiments are merely examples of the present invention. Thus, various drive circuits may be employed provided that the drive circuits are capable of driving the motor with the PWM control during the period from the start to the stop of the motor.

Figure 17:
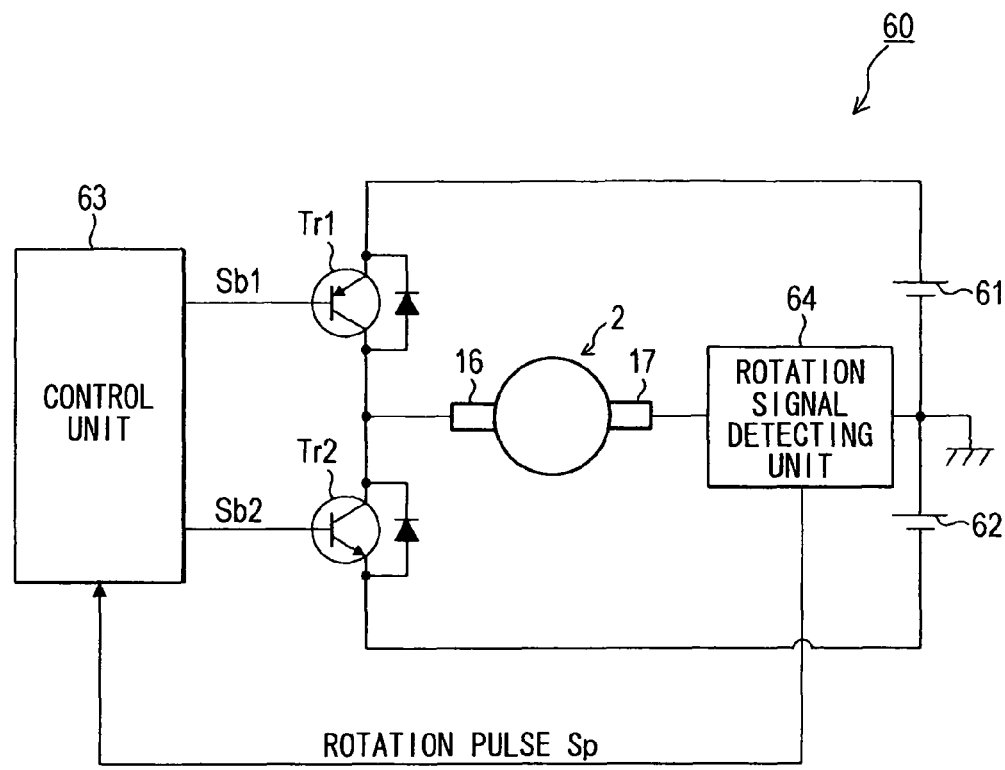
FIG. 17 is an explanatory diagram illustrating a rotation detecting system (drive circuit) according to another embodiment.

For example, as shown in FIG. 17, a drive circuit may be configure to include two power sources to control the motor under the normal and reverse rotation. A rotation detecting system 60 in FIG. 17 has a PNP bipolar transistor Tr1 located on a high side and an NPN bipolar transistor Tr2 located on a low side. The PNP bipolar transistor Tr1 is also referred to as a "high-side switch Tr1", and the NPN bipolar transistor Tr2 is also referred to as a "low-side switch Tr2". The high-side switch Tr1 and the low-side switch Tr2 constitute a T bridge (half bridge) configuration. The motor 2 has the brush 16 that is connected to a connection point between the transistors Tr1, Tr2 and has the other brush 17 that is grounded.

Also, the rotation detecting system 60 has two direct-current power sources 61, 62, and the direct-current power source 61 supplies electric power to the motor 2 through the high-side switch Tr1 when the high-side switch Tr1 is turned on. The direct-current power source 62 supplies electric power to the motor 2 through the low-side switch Tr2 when the low-side switch Tr2 is turned on.

A rotation signal detecting unit 64 is provided in a route formed between the ground and the brush 17 that is located on the ground-side of the motor 2, and the rotation signal detecting unit 64 generates the rotation pulse Sp based on the electric current that flows through the route. Then, the control unit 63 outputs drive signals Sb1, Sb2 respectively to the switches Tr1, Tr2 for the PWM control, and detects the rotation angle of the motor 2 based on the rotation pulse Sp from the rotation signal detecting unit 64.

A drive circuit of any configuration other than the T-bridge drive circuit shown in FIG. 17 may be alternatively employed provided that the drive circuit is capable of PWM-controlling the energization to the motor, which is a detection target.

Also, in the third embodiment, in order to PWM control the motor 2, the control is switched with the predetermined Duty between the energization control for the energization in the designated rotational direction and the short-circuit control for executing the short-circuit energization. The above switching control in the third embodiment is merely one example. For example, an alternative PWM control may be executed to switch the energization direction. More specifically, for example, the control may be switched with the predetermined Duty between (a) a control (normal rotation drive) for energization in the normal rotational direction and (b) another control (reverse rotation drive) for energization in the reverse rotational direction. In the above alternative case, for example, during the period from the start to the steady rotation state, the normal rotation drive and the reverse rotation drive may be switched with the Duty of 9:1, and thereby the motor is controlled for the normal rotation. During the period of the braking control state, the normal rotation drive and the reverse rotation drive may be controlled with the Duty of 5:5, and thereby the rotation of the motor is stopped because the average electric power is zero in the above duty control.

Alternatively, for example, an energization control for energization in the designated rotational direction and an opening control for turning off all the drive switches in order to open the connection between the brushes may be switched with a predetermined Duty. Also, the ratio of the Duty in each embodiment is one example.

Also, in each of the above embodiment, the energization to the motor is PWM-controlled in order to generate the alternating-current component in the motor electric current. Then, the rotational state of the motor is detected based on the alternating-current component. However, in a case, where the alternating-current component is mixed to the motor electric current for some reason without the above PWM control, the alternating-current component is extracted to generate the rotation pulse Sp, and thereby detecting the rotational state based on the rotation pulse Sp. Specifically, for example, if the motor is used in an environment, where noise of a certain frequency is always applied to the motor circuit, the noise component may be effectively used for the detection of the rotation.

Also, in the second embodiment, the motor has the capacitors C1, C2 of different capacitance values that are provided respectively in parallel to the first phase coil L1 and the second phase coil L2 in order to change the impedance in three steps. However, the configuration of the motor in the second embodiment is one example. Thus, the configuration of the motor may be modified in various manners provided that the impedance periodically change in three or more steps during the rotation. For example, inductance elements having different inductance values are respectively provided in parallel to any two phase coils. In another example, resistive elements of different resistance values are respectively provided in parallel to any two phase coils. Alternatively, a capacitor is connected to any one of the phase coils, and a series circuit having a capacitor and an inductance element is connected in parallel to the other one of the phase coils. Further alternatively, capacitors having different element values or inductance elements having different element values are respectively provided in parallel to phase coils.

Figure 18:
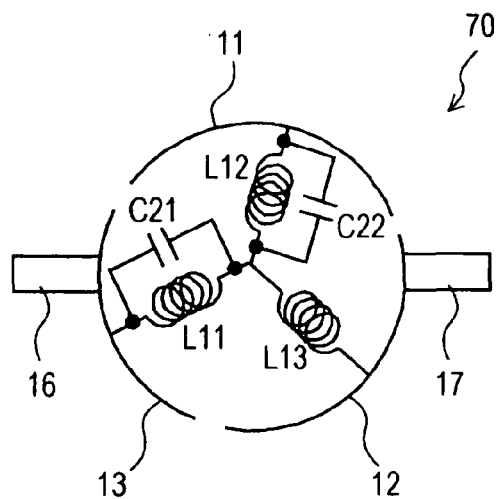
FIG. 18 is an explanatory diagram illustrating another motor to be detected according to still another embodiment.

Also, in each of the above embodiments, the motor, which is a detection target, has the phase coils L1, L2, L3 in delta connection. However, the configuration of the motor is not limited to the delta connection. For example, as shown in FIG. 18, a motor 70 may alternatively have phase coils L11, L12, L13 in start connection. In the case of the star connection, for example, the capacitors C21, C22 are respectively provided in parallel to the phase coils L11, L12 as shown in FIG. 18 in order to detect the rotation angle and the rotational direction of the motor 70.

It should be noted that the configuration shown in FIG. 18 is merely one example, and, for example, only one capacitor may be alternatively provided in parallel to one of the phase coils. For example, alternatively, three capacitors may be provided respectively in parallel to all the phase coils L11, L12, L13. However, in the above alternative case, the capacitance values of the capacitors are categorized into two values. Alternatively, for example, a capacitor may be provided between the two commutator segments.

Also, in each of the above embodiments, the three-phase direct-current motor having three phase coils of the armature is described. However, the present invention is applicable to a motor having four or more phase coils.

Figure 19:
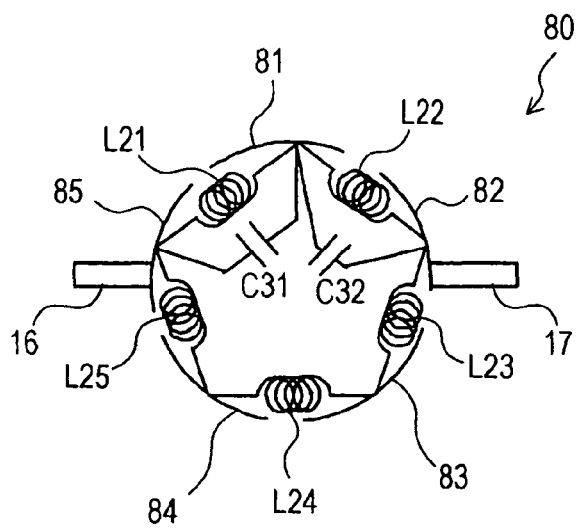
FIG. 19 is an explanatory diagram illustrating further another motor to be detected according to further another embodiment.

As an example of the present invention that is applied to the four-or-more-phase motor, FIG. 19 shows an example of a five-phase direct-current motor. A motor 80 shown in FIG. 19 has a commutator having five commutator segments 81, 82, 83, 84, 85, and each of phase coils L21, L22, L23, L24, L25 serving as armature coils is connected to the adjacent commutator segments to form delta connection. It should be noted that the inductance of each phase coil is equivalent to each other.

Capacitors C31, C32 are respectively provided in parallel to two phase coils (first phase coil L21, the second phase coil L22) of the phase coils L21, L22, L23, L24, L25. In the five-phase motor 80, it is possible to detect the rotation angle and the rotational speed.

It should be noted that when a capacitor is provided in parallel to one of the phase coils in the four-or-more-phase motor, it is possible to detect at least the rotation angle and the rotational speed. Also, when capacitors of different capacitance values are provided respectively in parallel to the two phase coils in the four-or-more-phase motor, it is also possible to detect the rotational direction based on the change pattern formed in accordance with the stepwise change of the impedance with the rotation, and thereby it is also possible to detect the rotational direction based on the change pattern of the amplitude of the alternating current.

Figure 20:
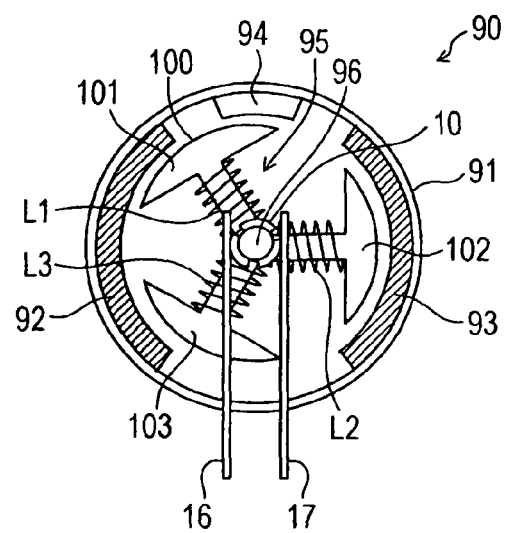
FIG. 20 is an explanatory diagram illustrating further another motor to be detected according to another embodiment.

Furthermore, alternative motor having a configuration different from the above embodiments may generate the periodical change of the impedance during the rotation. For example, a motor 90 shown in FIG. 20 is capable of generating the periodical change of the impedance during the rotation. The motor 90 of FIG. 20 has a housing 91 and a rotor core 100 received within the housing 91. The rotor core 100 is fixed to a rotation shaft 96 that is provided at a radial center of the housing 91, and rotatable with the rotation shaft 96.

The housing 91 has a generally hollow cylindrical shape, and the housing 91 has two magnets 92, 93 on an inner peripheral surface thereof. The magnets 92, 93 are arranged to radially face with each other and generate a field. When observed in a circumferential direction, the magnets 92, 93 are fixedly spaced apart from each other at a predetermined interval. The magnets 92, 93 are both permanent magnets, and one of the magnets 92, 93 has an N pole and the other one has an S pole on the respective surfaces that are opposed to the rotor core 100. In other words, the motor 90 is a direct-current motor having a two-pole field.

Also, the housing 91 is made of a yoke that is a soft magnetic material, and the housing 91 and the magnets 92, 93 fixed on the inner peripheral surface of the housing 91 constitute a magnetic circuit of the motor 90.

The rotor core 100 is made of a yoke that is a soft magnetic material, and has three teeth (salient pole) 101, 102, 103, around which an armature coil 95 is wound. More specifically, the first phase coil L1 is wound around the first tooth 101, the second phase coil L2 is wound around the second tooth 102, and the third phase coil L3 is wound around the third tooth 103. The three phase coils L1, L2, L3 constitute the armature coil 95.

Also, the commutator 10 is fixed to the rotation shaft 96, and the commutator 10 contacts a pair of brushes 16, 17 that are arranged to face with each other. In other words, the brushes 16, 17 are separate from each other 180 degrees in the rotational direction. A connection state between the commutator 10 and the phase coils L1, L2, L3 is similar to that of the motor 2 in the first embodiment (see FIG. 1).

Furthermore, the motor 90 has a protrusion 94 on the inner peripheral surface of the housing 91 between the magnets 92, 93. Because the magnets 92, 93 are provided on the inner peripheral surface of the housing 91 and spaced apart from each other, by a predetermined interval in the circumferential direction, there are two inter-magnet regions on the inner peripheral surface between the magnets 92, 93 in the circumferential direction, on which region the magnet does not exist. In the motor 90, as shown in FIG. 20, the protrusion 94 is provided to radially inwardly projects from one of the above inter-magnet regions of the inner peripheral surface of the housing 91. Also, the protrusion 94 is spaced apart by a predetermined distance from the magnets 92, 93 in the circumferential direction such that the protrusion 94 does not contact the magnets 92, 93.

The protrusion 94 is made of a soft magnetic material, and has a predetermined length in the circumferential direction.

Also, the protrusion 94 has a predetermined thickness in the radial direction. Because the protrusion 94 is provided, the magnetic circuit formed by the rotor core 100 and the housing 91 of the motor 90 has a magnetic resistance that is changeable in accordance with the rotation of the rotor core 100. It should be noted that in the description below, "magnetic resistance" indicates the magnetic resistance of the magnetic circuit formed by the rotor core 100 and the housing 91 of the motor 90 except where specified.

The rotor core 100 and the housing 91 are both made of a soft magnetic material, and each has a magnetic permeability that is substantially larger than a magnetic permeability of air. As a result, the magnetic resistance of the motor 90 greatly depends on air gap between (a) the rotor core 100 (or the outer peripheral surfaces of the tooth 101, 102, 103) and (b) the magnets 92, 93 or the inner peripheral surface of the housing 91. Also, the magnetic resistance of the motor 90 greatly depends on the sum of the thicknesses of the magnets 92, 93. In other words, when the magnetic resistance is increased with the increase of air gap, and in contrast, the magnetic resistance is reduced with the decrease of air gap.

Each of the magnets 92, 93 has a magnetic permeability that is generally equivalent to the magnetic permeability of air. As a result, in a view point of the magnetic characteristic, the existence of the magnets 92, 93 is equivalent to the existence of the air. In other words, in the consideration of the magnetic resistance of the motor 90, it is possible to neglect the existence of the magnets 92, 93 that has the magnetic permeability equivalent to that of air. Thus, the magnets 92, 93 are treated as air gap. Thereby, if the protrusion 94 does not exist, air gap between the rotor core 100 and the inner peripheral surface of the housing 91 is constant even when the rotor core 100 rotates, and thereby the magnetic resistance does not change with the rotation.

However, the motor 90 is provided with the protrusion 94 at the inner peripheral surface of the housing 91, and the protrusion 94 is soft magnetic and has the magnetic permeability generally similar to that of the housing 91. As a result, the value of the magnetic resistance of the motor 90 changes with the change of the rotation angle of the motor 90. In other words, the value of the magnetic resistance of the motor 90 changes depending on whether each of the teeth 101, 102, 103 of the corresponding outer peripheral surface of the rotor core 100 faces the protrusion 94. As above, the magnetic resistance changes with the rotation of the motor 90. When the magnetic resistance changes, the inductance of the motor circuit changes, and thereby the amplitude of alternating-current component of the motor electric current supplied to the electric current detecting unit 21 changes accordingly.

The change of amplitude periodically occurs in accordance with the rotation of the motor 90. More specifically, the change of amplitude periodically occurs in accordance with the rotation of the rotor core 100 and the rotation shaft 96. Thus, it is possible to detect the rotation angle of the motor 90 based on the change of the amplitude of the alternating current similarly to each of the above embodiments.

It should be noted that various configurations other than the configuration of the motor 90 shown in FIG. 20 may be alternatively periodically change the inductance of the motor circuit by devising the housing. More specifically, it is possible to characterize a change pattern of the inductance of the motor circuit in accordance with the rotation by changing the position of the protrusion and the number of the protrusion, or by devising the shape of the protrusion.

Also, the capacitor C1 is connected perfectly in parallel to the entirety of the first phase coil L1 in the first embodiment. However, for example, a center tap is provided at a part of the first phase coil L1, and one end of the capacitor C1 may be alternatively connected to the center tap of the first phase coil L1 such that the capacitor C1 is provided partially in parallel to the part of the first phase coil L1.

Also, in a general direct-current motor, a ring varistor may be employed in order to absorb the surge. In the above case of the motor having the ring varistor, the periodical change of the impedance is generated in accordance with the rotation by using the ring varistor.

For example, the capacitor and the inductance element may be connected between adjacent electrodes of the multiple electrodes of the ring varistor. For example, without connecting the additional capacitor and inductance element as in the above case of the various motor, it is alternatively possible to generate the periodical change of the impedance by devising the configuration of the ring varistor itself, such as differentiating the areas of the electrodes.

Also, in each of the above embodiments, the momentary change of the impedance of the motor circuit caused when the connection state between the commutator segments and the respective brush changes during the rotation of the motor is not considered. However, the impedance actually changes although the change is very momentary. Also, the change of the impedance periodically occurs with the rotation. As a result, it is possible to detect the rotational state, such as the rotation angle, based on the momentary change of the impedance. In other words, it is alternatively possible to detect the rotational state based on the change of the alternating-current component caused by the above momentary change. The above alternative case does not require the capacitor and the inductance element of the motor 2 in each of the above embodiments in order to change the impedance of the motor circuit.

Also, in each of the above embodiments, the electric current detecting unit 21 employs the electric current detecting resistor R1. However, a coil (inductance element) may be alternatively employed to replace the electric current detecting resistor R1, for example.

Also, the configuration of the rotation signal detecting unit of each embodiment (see FIG. 4 and FIG. 10) is merely one example. Thus, the configuration of the present invention is not limited to the shown and described configuration. For example, various configurations may be employed provided that the rotation pulse Sp is generated based on the detection signal from the electric current detecting unit.

Figure 21:
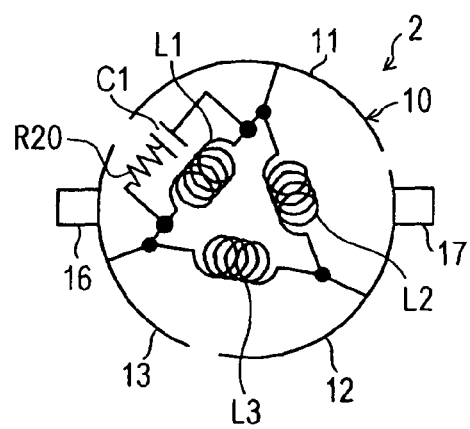
FIG. 21 is an explanatory diagram illustrating further another motor to be detected according to another embodiment.

As an alternative configuration of the motor 2 (FIG. 21), a resistor R20 may be provided in series to the capacitor C1 in order to control the charge and discharge of the capacitor C1 and to protect the commutator and the brush. The capacitor C1 may be replaced by a coil.

Figure 22:
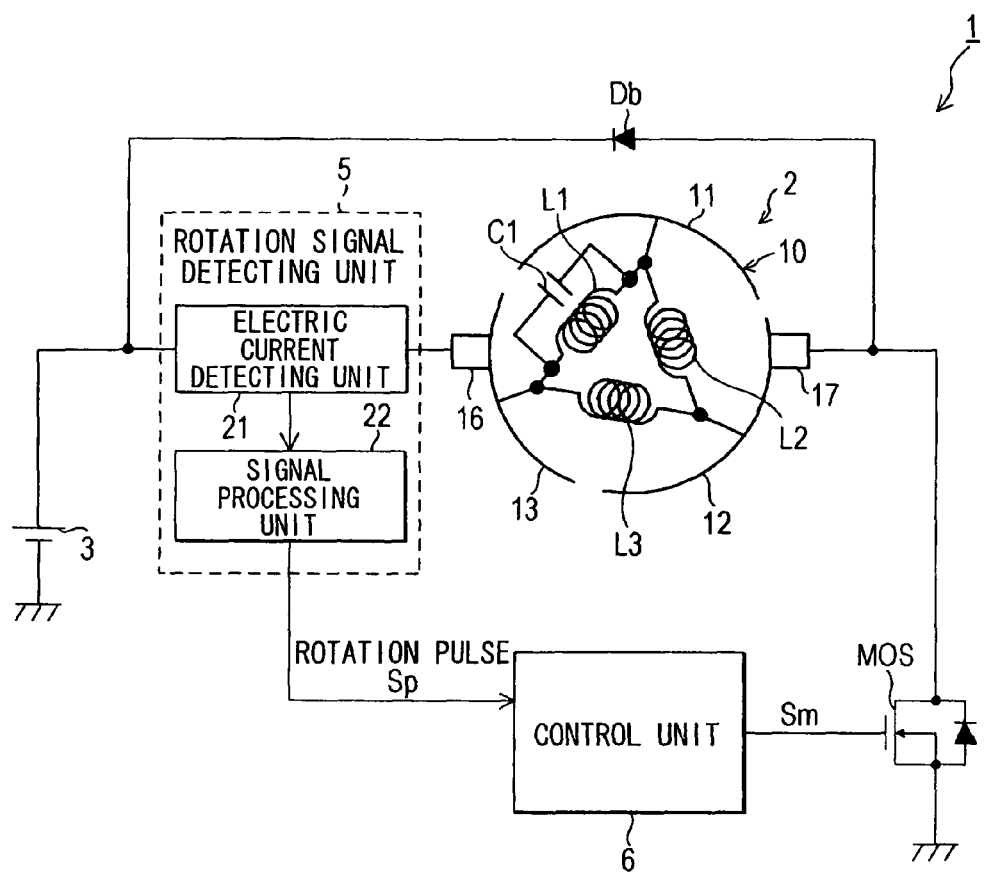
FIG. 22 is a diagram illustrating a schematic configuration of a rotation detecting system according to the modification.

Also, only one of the direct current power source switch 4 and the drive switch MOS may be alternatively provided for the motor control although both of the power source switch 4 and the drive switch MOS are provided in the circuit in the first embodiment of FIG. 1. For example, FIG. 22 shows a configuration of a rotation detecting system according to the modification, in which the direct-current power source switch 4 is removed, and thereby only the drive switch MOS is provided for the motor control.

Figure 23:
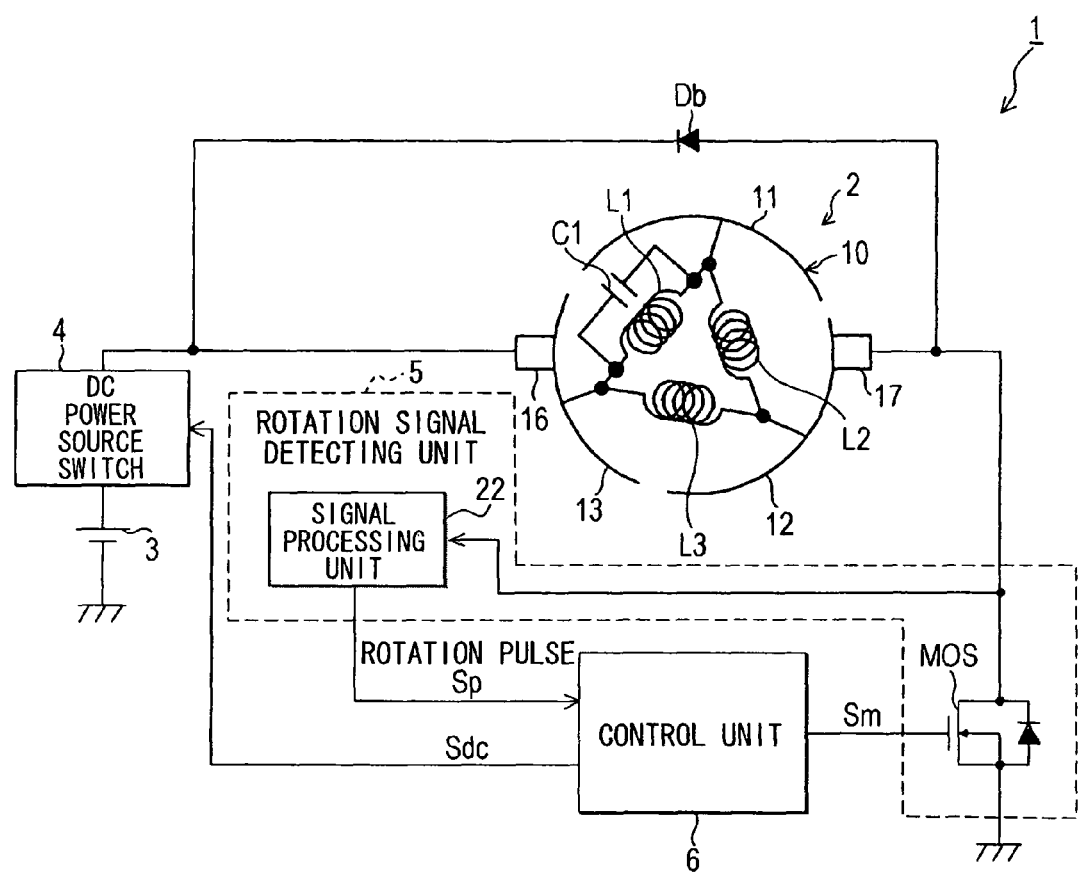
FIG. 23 is a diagram illustrating a schematic configuration of a rotation detecting system according to another modification.

Also, in another modification, the internal resistor of the drive switch MOS, which serves as a switching device, may replace the electric current detecting resistor R1. In FIG. 23, the electric current detecting resistor R1 of the first embodiment is removed, and instead, the signal processing unit 22 and the drive switch MOS constitute the rotation signal detecting unit 5.

Also, the switching device in the above embodiments is not limited to the drive switch MOS, but may employ a device other than the drive switch MOS.

Also, in each of the above embodiments, the motor having the pair of brushes is described. However, the present invention may be applied to a motor having multiple pairs of brushes.

Additional advantages and modifications will readily occur to those skilled in the art. The invention in its broader terms is therefore not limited to the specific details, representative apparatus, and illustrative examples shown and described.

What is claimed is:

1. A rotation detecting apparatus for detecting a rotational state of a direct-current motor that is rotatable by a power supplied from a direct-current power source, wherein the direct-current motor has at least one pair of brushes, to which a direct-current voltage is applied from the direct-current power source, wherein an impedance between the at least one pair of brushes is changeable periodically in accordance with rotation of the direct-current motor, the rotation detecting apparatus comprising:
    a driving device provided in an energization route in a circuit having the direct-current power source and the direct-current motor, wherein the driving device has at least one switching device that is configured to open and close the energization route to control energization therethrough;
    a control device that is configured to turn on and off the at least one switching device of the driving device;
    an energization detecting device that detects an electrical quantity of electric current that is supplied to the direct-current motor;
    an alternating-current component detecting device that is configured to detect change of an alternating current component of the electric current that is supplied to the direct-current motor based on the electrical quantity detected by the energization detecting device, wherein the change of the alternating-current component is caused by change of the impedance caused in accordance with the rotation of the direct-current motor; and
    a rotational state detecting device that is configured to detect at least one of a rotation angle, a rotational direction, and a rotational speed of the direct-current motor based on a detection result of the alternating-current component detecting device; wherein
    the control device executes a PWM control for turning on and off the at least one switching device of the driving device with a predetermined frequency and duty ratio in order to control the rotation of the direct-current motor;
    the PWM control executed by the control device causes fluctuation of the electric current supplied to the direct-current motor;
    the fluctuation of the electric current corresponds to the alternating-current component;
    the direct-current motor is configured to form a certain state during a capacitance element connection period in one rotation of the direct-current motor;
    in the certain state, a capacitance element having a predetermined capacitance value is formed between the at least one pair of brushes;
    a charge electric current is supplied to the capacitance element at timing of opening the energization route from the direct-current power source to the direct-current motor in the PWM control during the capacitance element connection period;
    a discharge electric current is discharged from the capacitance element at timing of closing the energization route in the PWM control during the capacitance element connection period; and
    at least one of the charge electric current and the discharge electric current corresponds to the alternating-current component.

2. The rotation detecting apparatus according to claim 1, wherein:
    in order to stop the direct-current motor that rotates, the control device executes the PWM control with the duty ratio having a certain value such that the direct-current motor stops rotating.

3. The rotation detecting apparatus according to claim 1, wherein:
    the at least one switching device of the driving device includes a plurality of switching devices;
    the driving device is configured to switch an energization direction for energizing the direct-current motor based on an on/off state of each of the plurality of switching devices in order to switch rotational direction of the direct-current motor;
    the control device executes the PWM control for switching the energization direction from the direct-current power source to the direct-current motor with the duty ratio in order to control the rotation of the direct-current motor.

4. The rotation detecting apparatus according to claim 3, wherein:
    the plurality of switching devices of the driving device includes four switching devices that form an H bridge circuit.

5. A rotation detecting apparatus for detecting a rotational state of a direct-current motor that is rotatable by a power supplied from a direct-current power source, wherein the direct-current motor has at least one pair of brushes, to which a direct-current voltage is applied from the direct-current power source, wherein an impedance between the at least one pair of brushes is changeable periodically in accordance with rotation of the direct-current motor, the rotation detecting apparatus comprising:
    a driving device provided in an energization route in a circuit having the direct-current power source and the direct-current motor, wherein the driving device has at least one switching device that is configured to open and close the energization route to control energization therethrough;
    a control device that is configured to turn on and off the at least one switching device of the driving device;
    an energization detecting device that detects an electrical quantity of electric current that is supplied to the direct-current motor;
    an alternating-current component detecting device that is configured to detect change of an alternating current component of the electric current that is supplied to the direct-current motor based on the electrical quantity detected by the energization detecting device, wherein the change of the alternating-current component is caused by change of the impedance caused in accordance with the rotation of the direct-current motor; and
    a rotational state detecting device that is configured to detect at least one of a rotation angle, a rotational direction, and a rotational speed of the direct-current motor based on a detection result of the alternating-current component detecting device; wherein
    the control device executes a PWM control for turning on and off the at least one switching device of the driving device with a predetermined frequency and duty ratio in order to control the rotation of the direct-current motor;

the PWM control executed by the control device causes fluctuation of the electric current supplied to the direct-current motor;

the fluctuation of the electric current corresponds to the alternating-current component;

the at least one switching device of the driving device includes a plurality of switching devices;

when one or more of the plurality of switching devices is turned on, a short circuit is established across the direct-current motor;

the control device is configured to execute an energization control, in which electric current is allowed to flow from the direct-current power source to the direct-current motor;

the control device is configured to execute a short-circuit control, in which the short circuit is established across the direct-current motor; and the control device executes the PWM control to switch control of the direct-current motor between the energization control and the short-circuit control with the duty ratio in order to control the rotation of the direct-current motor.

6. The rotation detecting apparatus according to claim 5, wherein:

the plurality of switching devices of the driving device includes four switching devices that form an H bridge circuit.

* * * * *